US011113689B2

United States Patent
Stark et al.

(10) Patent No.: US 11,113,689 B2
(45) Date of Patent: Sep. 7, 2021

(54) TRANSACTION POLICY AUDIT

(71) Applicant: SAP SE, Walldorf (DE)

(72) Inventors: Michael Stark, Bellevue, WA (US);
Evan Adkins, Bellevue, WA (US);
Adithya Kumar, Bellevue, WA (US);
Suchitra Sundararaman, Bellevue,
WA (US); Jesper Lind, Bellevue, WA
(US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/577,997

(22) Filed: Sep. 20, 2019

(65) Prior Publication Data

US 2021/0004798 A1   Jan. 7, 2021

Related U.S. Application Data

(60) Provisional application No. 62/870,512, filed on Jul. 3, 2019.

(51) Int. Cl.
*G06Q 20/40* (2012.01)
*G06N 20/00* (2019.01)
(Continued)

(52) U.S. Cl.
CPC ......... *G06Q 20/40* (2013.01); *G06F 40/284* (2020.01); *G06K 9/00456* (2013.01);
(Continued)

(58) Field of Classification Search
USPC ....................................................... 705/39
See application file for complete search history.

(56) References Cited

U.S. PATENT DOCUMENTS 6,029,144 A * 2/2000 Barrett .................. G06Q 99/00
235/375
9,922,375 B1   3/2018 Neveu
(Continued)

OTHER PUBLICATIONS

AppZen, "Expense Audit Report by AppZen" Oct. 2018, [retrieved on Apr. 21, 2021], retrieved from: URL <https://vimeo.com/294657148>, 11 pages.
(Continued)

*Primary Examiner* — Hani M Kazimi
*Assistant Examiner* — Hatem M Ali
(74) *Attorney, Agent, or Firm* — Fish & Richardson P.C.

(57) ABSTRACT

The present disclosure involves systems, software, and computer implemented methods for transaction auditing. One example method includes receiving receipt data associated with an entity. Policy questions associated with the entity are associated with at least one policy question answer that corresponds to a conformance or a violation of a policy selected by the entity. For each policy question, a machine learning policy model is identified for the policy question that includes, for each policy question answer, receipt data features that correspond to the policy question answer. The machine learning policy model is used to automatically determine a selected policy question answer to the policy question by comparing features of extracted tokens to respective receipt data features of the policy question answers that are included in the machine learning policy model. In response to determining that the selected policy question answer corresponds to a policy violation, an audit alert is generated.

17 Claims, 16 Drawing Sheets

(51) Int. Cl.

| | |
|---|---|
| *G06Q 40/00* | (2012.01) |
| *G06K 9/18* | (2006.01) |
| *G06K 9/00* | (2006.01) |
| *G06K 9/62* | (2006.01) |
| *G06N 3/02* | (2006.01) |
| *G06F 40/284* | (2020.01) |
| *G06Q 20/04* | (2012.01) |
| *G06Q 20/38* | (2012.01) |
| *G06T 7/73* | (2017.01) |
| *G06N 3/08* | (2006.01) |
| *G06T 7/00* | (2017.01) |
| *G06F 16/2455* | (2019.01) |

(52) U.S. Cl.
CPC ..... *G06K 9/00463* (2013.01); *G06K 9/00483* (2013.01); *G06K 9/18* (2013.01); *G06K 9/6267* (2013.01); *G06N 3/02* (2013.01); *G06N 3/08* (2013.01); *G06N 20/00* (2019.01); *G06Q 20/045* (2013.01); *G06Q 20/389* (2013.01); *G06Q 20/4016* (2013.01); *G06Q 40/12* (2013.12); *G06T 7/0002* (2013.01); *G06T 7/74* (2017.01); *G06F 16/24564* (2019.01); *G06T 2207/20061* (2013.01); *G06T 2207/30176* (2013.01)

(56) References Cited

U.S. PATENT DOCUMENTS

| | | | |
|---|---|---|---|
| 10,210,579 B1 | 2/2019 | Neveu et al. | |
| 10,878,232 B2 | 12/2020 | Lorenzini et al. | |
| 2003/0065574 A1* | 4/2003 | Lawrence | G06Q 30/06 705/26.82 |
| 2005/0033617 A1 | 2/2005 | Prather et al. | |
| 2005/0289025 A1 | 12/2005 | Fredericks et al. | |
| 2011/0113029 A1 | 5/2011 | Kaal | |
| 2012/0185368 A1 | 7/2012 | Schloter et al. | |
| 2012/0209640 A1 | 8/2012 | Hamper et al. | |
| 2013/0254494 A1 | 9/2013 | Oxford et al. | |
| 2016/0078566 A1 | 3/2016 | Farrell et al. | |
| 2016/0180727 A1* | 6/2016 | Gross | G09B 7/02 434/353 |
| 2016/0358268 A1* | 12/2016 | Verma | G06F 16/24564 |
| 2017/0200234 A1 | 7/2017 | Morse et al. | |
| 2017/0264619 A1* | 9/2017 | Narayanaswamy | H04L 63/0281 |
| 2018/0225673 A1* | 8/2018 | Dubey | G06Q 10/10 |
| 2019/0057456 A1 | 2/2019 | Saft et al. | |
| 2020/0065912 A1 | 2/2020 | Bender et al. | |
| 2020/0074359 A1 | 3/2020 | Subramanian et al. | |
| 2020/0104587 A1 | 4/2020 | Bhatnagar et al. | |
| 2020/0218890 A1 | 7/2020 | Mehta | |
| 2021/0004795 A1 | 1/2021 | Stark et al. | |
| 2021/0004912 A1 | 1/2021 | Stark et al. | |

OTHER PUBLICATIONS

Appzen.com [online], "Back to school special: AppZen AI 101" Aug. 2018 [retrieved on Apr. 21, 2021], retrieved from: URL <https://www.appzen.com/blog/back-to-school-special-appzen-ai-101/>, 3 pages.

Mwu.sutisoft.com [online], "How Artificial Intelligence Can Transform Expense Management" Sep. 2018, [retrieved on Apr. 21, 2021], retrieved from: URL <https://mwu.sutisoft.com/blog/how-artificial-intelligence-can-transform-expense-management>, 3 pages.

Non-Final Office Action issued in U.S. Appl. No. 16/578,016 dated Apr. 21, 2021, 23 pages.

Extended European Search Report issued in European Application No. 20183789.5 dated Dec. 14, 2020, 17 pages.

Non-Final Office Action issued in U.S. Appl. No. 16/577,821 dated Feb. 10, 2021, 47 pages.

Zhu et al., "Extracting relevant named entities for automated expense reimbursement." Proceedings of the 13th ACM SIGKDD international conference on Knowledge discovery and data mining. Aug. 2007, 9 pages.

\* cited by examiner

FIG. 6 *600*

Policy Examples

- 1002 — Itemized receipt
- 1004 — Traveler name on receipt
- 1006 — Valid tax receipt
- 1008 — No Collusion
- 1010 — No Personal Services
- 1012 — No Personal Items
- 1014 — No Personal Entertainment
- 1016 — No Traffic/Parking violations
- 1018 — No Penalty ticket fee
- 1020 — No Companion Travel
- 1022 — No Travel Insurance
- 1024 — No Excessive Tips
- 1026 — No Premium Air Seating
- 1028 — No Add-on air charges
- 1030 — No Premium Car Class
- 1032 — No Add-on Car Rental Charges
- 1034 — No Add-on Hotel charges
- 1036 — No Alcohol
- 1038 — No Pet Care, Child Care, Elder Care, House Sitting
- 1040 — No Late, Interest, or Delinquency Charges
- 1042 — No Health Club or Gym Charges
- 1044 — No Car Washes

FIG. 10  *1000*

TRANSACTION POLICY AUDIT

CLAIM OF PRIORITY

This application claims priority under 35 USC § 119(e) to U.S. Provisional Patent Application Ser. No. 62/870,512, filed on Jul. 3, 2019, the entire contents of which are hereby incorporated by reference.

CROSS-REFERENCE TO RELATED APPLICATIONS

This application is a co-pending application of, and filed in conjunction with U.S. patent application Ser. No. 16/577,821 filed on Sep. 20, 2019, entitled "ANOMALY AND FRAUD DETECTION USING DEPLICATE EVENT DETECTOR" and U.S. patent application Ser. No. 16/578,016 filed on Sep. 20, 2019, entitled "TRANSACTION AUDITING USING TOKEN EXTRACTION AND MODEL MATCHING"; the entire contents of each and together are incorporated herein by reference.

TECHNICAL FIELD

The present disclosure relates to computer-implemented methods, software, and systems for transaction auditing.

BACKGROUND

Travel and travel-related expenses can be a large expense for organizations. An automated expense management system can be used to analyze, monitor, and control travel and other reimbursable expenses, while maintaining accuracy and increasing worker productivity. An automated expense management system can enable employees to spend less time creating and monitoring expense reports, which can allows workers to spend more time on core job functions.

SUMMARY

The present disclosure involves systems, software, and computer implemented methods for transaction auditing. One example method includes receiving receipt data associated with a request associated with a first entity, wherein the receipt data includes tokens extracted from at least one receipt; identifying policy questions associated with the first entity, wherein each policy question is associated with at least one policy question answer, and wherein each policy question answer corresponds to a conformance or a violation of a policy selected by the first entity; and for each respective policy question in the identified policy questions: identifying a machine learning policy model for the respective policy question based on a mapping associated with the first entity that maps policy questions to machine learning policy models, wherein the machine learning policy model is trained based on historical determinations of policy question answers for the respective policy question for historical receipt data, and wherein the machine learning policy model includes, for each policy question answer, receipt data features that correspond to the policy question answer; using the machine learning policy model to automatically determine a selected policy question answer to the respective policy question by comparing features of the extracted tokens to respective receipt data features of the policy question answers that are included in the machine learning policy model; and in response to determining that the selected policy question answer corresponds to a policy violation, generating an audit alert.

Implementations may include the following features. The historical determination of policy question answers to the respective policy question can be determined, based on the historical receipt data, by previous executions of the machine learning policy model. The historical receipt data can include information from multiple entities, wherein the multiple entities include a second entity that is different from the first entity. A failure to identify a machine learning policy model for the first policy question can occur. The receipt data can be forwarded to a secondary review process in response to failing to identifying a machine learning policy model for the first policy question. The policy questions associated with the first entity can include standard policy questions common to multiple entities. The policy questions associated with the first entity can include custom questions specific to the first entity. Different policy questions that have a same semantic meaning can be mapped to a same machine learning policy model. Identifying the machine learning policy model can include identifying a keyword-based model. The keyword-based model can be configured to identify one or more keywords in the extracted tokens. Identifying the machine learning policy model can include identifying a neural network model. The network model can be a recurrent neural network model. The neural network model can be configured to perform character analysis of the receipt data to identify features that indicate a policy violation or a policy conformance. The features can include keyword patterns, receipt text format, and receipt layout.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 10 is a list of example policies.

DETAILED DESCRIPTION

A software provider can deliver travel booking and expense reporting service to corporate customers. For example, expense, invoicing, auditing and other services can be offered. Expense and audit services can be coupled so that expense reports that are submitted also include a workflow step where the expense is audited.

A compliance verification (e.g., audit), can include two distinct areas: receipt audit (verifying expense report claim/supporting documentation consistency) and policy audit (verifying compliance with entity-defined policies). The software provider can employ human auditors to review receipts and other information for policy compliance.

As another example, various machine learning approaches can be employed to replace and/or augment human auditors. Machine learning approaches for auditing can result in several advantages. Machine learning approaches can result in faster auditing timelines, which can increase customer satisfaction. Machine learning approaches can lessen a need for human auditors, which can save resources. Machine learning approaches can be more accurate and more tunable than human-based approaches.

Machine learning audit results can be triggered and reported at various time points, such as while a user is building an expense report (as well as after expense report submission). Flexible and real time (or near real time) feedback can improve a user experience. More immediate feedback can notify and make users more aware of auditing procedures that are being employed, which can lessen an occurrence of attempted fraudulent submissions.

Machine learning approaches can leverage audit questions that have already been configured and used by human auditors in manual review cycles. Machine learning models can be trained using a historical database of audit results produced by human and/or machine-based auditing. Machine learning models can be tuned for particular customers. Machine learning approaches can reduce or eliminate errors otherwise possible due to human fatigue and/or human error. Machine learning approaches can make use of large amounts of available data such as past transaction logs, enabling audits that humans could not perform in practice in a realistic amount of time.

Figure 1:
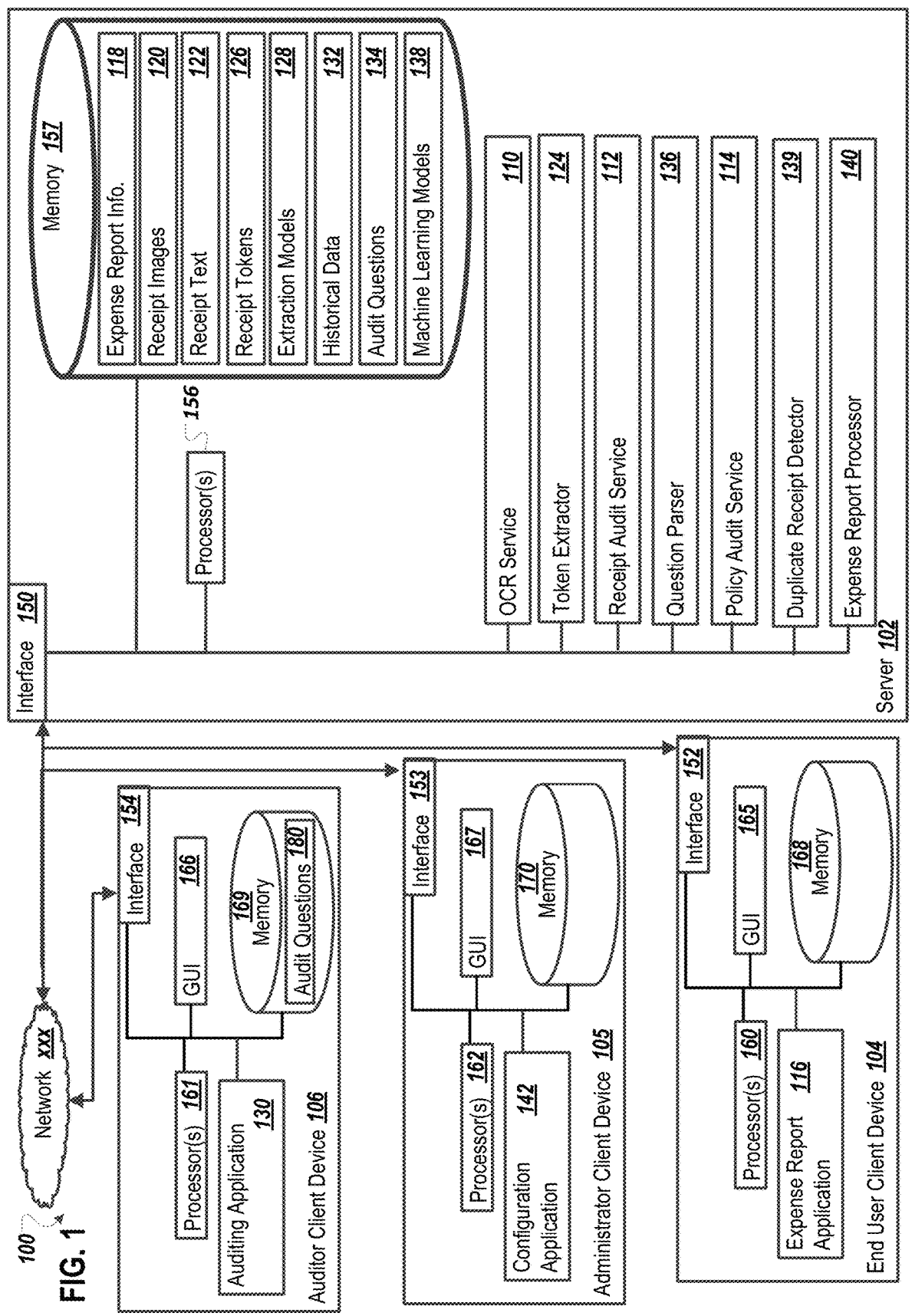
FIG. 1 is a block diagram illustrating an example system for expense report auditing.

FIG. 1 is a block diagram illustrating an example system 100 for expense report auditing. Specifically, the illustrated system 100 includes or is communicably coupled with a server 102, an end-user client device 104, an administrator client device 105, an auditor client device 106, and a network 108. Although shown separately, in some implementations, functionality of two or more systems or servers may be provided by a single system or server. In some implementations, the functionality of one illustrated system or server may be provided by multiple systems or servers. For instance, the server 102 is illustrated as including an OCR (Optical Character Recognition) service 110, a receipt audit service 112, and a policy audit service 114, which may be provided by the server 102, as shown, or may be provided by a combination of multiple different, servers, with each server providing one or more services.

A user can use an expense report application 116 on the end-user client device 104 to work on (and eventually submit) an expense report to the server 102. Expense report information 118 (for a submitted or a work-in progress expense report) and receipt images 120 can be received by the server 102. The OCR service 110 can extract receipt text 122 from the receipt images 120. A token extractor 124 can extract tokens 126, such as an amount, a date, a vendor name, a vendor location, and an expense type, from the receipt text 122, using extraction models 128.

The receipt audit service 112 can ensure that user-provided documentation, such as a receipt, backs up a claim that the user has submitted (or is working on). The receipt audit service 112 can verify, for example, that a date, an amount, a currency, a vendor name, a vendor location, and an expense type are supported by the user-provided documentation (e.g., receipt(s)). An expense management system can employ, for example, human auditors to review receipts to ensure that receipts are in compliance with submitted claims.

As another example, the receipt audit service 112 can include a machine learning engine that can perform some, if not all, review tasks previously performed by human auditors. The receipt audit service 112 can be configured to replace or augment human auditors. For instance, based on confidence values produced by the token extractor 124 and the receipt audit service 112, outputs (e.g., in-compliance, compliance-violation) of the machine learning engine can be used automatically, without human intervention (e.g., if confidence values for compliance or non-compliance are high). As another example, a receipt audit task can be routed to a human auditor for a manual review (e.g., if a machine learning confidence value is low (e.g., inconclusive). For example, a human auditor can use an auditing application on the auditor client device 105.

In further detail, the receipt audit service 112 can compare the receipt tokens 126 to corresponding items in the expense report information 118. The receipt audit service 112 can generate an audit alert in response to determining that an identified token does not match a corresponding item in the expense report information 118. Audit alerts can be provided to the end-user client device 104 for presentation in the expense report application 116. The user who provided the expense report information 112 can receive an alert when running the expense report application 116 in a user mode. A manager of the user can receive an alert in the expense report application 116 (e.g., on a different end-user client device 104) when running the expense report application 116 in a manager mode, for example.

Matches and conflicts between receipt tokens 126 and expense report information 118 can be stored as new historical data 132. In some implementations, matching and conflicting values are used to select answers to audit questions 134. Audit questions 134 can be stored for each entity. The audit questions 134 can be questions that a human auditor can answer when performing a manual audit. Different entities may have different requirements about what information is needed to match for a receipt to pass a receipt audit. For example, a first entity may require that a receipt include a name of a user that matches a user name included in the expense report information 118, whereas a second entity may not require presence of a user name for some or all types of expenses. An audit question for a receipt audit therefore may be "Does the receipt include a user name that matches an expense report user name?". Other receipt audit questions can be "does the amount match?", "does the date match?", or "does the vendor name match?" (e.g., between the receipt tokens 126 and the expense report information 118).

The receipt audit service 112 can be configured to programmatically determine answers to receipt audit questions identified for the customer in the audit questions 134. An answer can be selected or determined based on an answer confidence value, which can be based on extraction confidence values returned by the token extractor 124 (e.g., that represent a confidence of the token extractor 124 with regards to identifying a certain type of token (e.g., a date) and an actual token value (e.g., a date value, such as Apr. 2, 2019). Extraction confidence values can be affected by OCR/receipt image quality, how familiar a receipt layout is to the token extractor 124, etc. An answer confidence value can be determined based on combining extraction confidence values returned by the token extractor for token values (e.g., an amount, a date) that may be needed to answer a particular audit question.

The audit questions 134 can support a human-based audit system that allows arbitrary customizations of audit questions. In some implementations, the receipt audit service 112 uses a question parser 136 to match audit questions 134 for an entity to specific machine learning models 138 that have been configured and trained to answer those types of questions. The question parser 136 can identify audit questions 134 for the entity that do not match any specific question for which there is a model in the machine learning models 138. In such cases, a receipt image 120, expense report information 118, and the audit question may be forwarded to the auditor client device 106 for review by a human auditor using the auditing application 130.

The question parser 136 can also parse the answers to each question, matching them with the answers that the models are capable of providing. The question parser 136 can rejection questions which it cannot match the question text to one of the specific model texts and for which it cannot match all answers to the answers the model is capable of providing. For example, the question parser 136 can reject questions for which it cannot match the question text to text describing the model or for which it cannot match all answers to answers the model is capable of providing. For example, if a model is for the question "Is there alcohol on the receipt?" and the expected answers choices are "Yes" and "No" but the supplied question also included the possible answer choice "Yes, but with food," the question parser 136 may refuse to address the question because this possible answer doesn't match one of the available choices. As another example, some questions may allow multiple answer choices to be selected at the same time. For example, the question "Are there additional charges on a hotel receipt?" might have included the answer choices "Yes, in-room movies" and "Yes, laundry service" which could both be true for the same hotel receipt. In that case the model can select both choices at the same time.

The question parser 136 can also be used by the policy audit service 114. A policy audit refers to a process of analyzing whether the claim initiated by the end user is compliant with various policies that the organization has configured. The system can support both a standard selection of questions that the entity can chose from, as well as the option of configuring new questions that are unique to the entity. The policy audit service 114 can be designed to automatically work with both a standard set of questions as well as questions that were configured by the entity. An example of a policy question can be "Are there alcohol charges present?" Semantically similar questions in the audit questions 134 can be clustered based on any suitable clustering algorithm, and the question parser 136 can identify a policy model for a policy question in the machine learning models 138. The policy audit service 114 can use identified policy models to determine answers to the policy questions configured for the entity.

A policy model can be a keyword-based model or another type of model, such as a neural network model. Keyword-based models are models which are trained to look for specific samples of text (keywords) in the OCR text of a receipt. The list of keywords for a keyword-based model may be developed in several ways. For example, keyword lists can be generated by having human annotators look at receipts and select important keywords by hand. As another example, machine learning methods can be trained on a large population of receipts with known labels with respect to policy questions and can automatically determine a list of keywords. As yet another example, a hybrid system can be used which iterates between the human auditor and machine learning keyword generation methods, where a machine learning model can learn to classify receipts and human annotators can determine keywords (or groups of related keywords) for the receipts the machine learning model fails to classify with high confidence.

Keyword models can also benefit from an embedding model that can automatically learn variant forms of keywords created by imperfections in OCR processes. A machine learning model can automatically learns the keyword form variants by exposure to a large database of receipt texts.

A policy model can be a neural network model. A neural network model can use a more holistic approach to a receipt than keyword identification. For example, recurrent neural networks can evaluate a whole set of receipt text character by character and make a determination about whether the receipt passes or fails a particular policy. The recurrent neural network models can learn what features of the receipt text are important (e.g., keywords and also text format or layout or patterns of keywords) with minimal design input from human annotation.

Policy models can be used to generate a classification that allows the system to select a specific answer from a list of possible answers to a well-determined question. Other types of audits can be performed. For instance, a duplicate receipt detector 139 can perform various algorithms to determine whether a submitted receipt is a duplicate, as described in more detail below. If an expense report item successfully passes audits that have been configured for the entity, the expense can be processed for the user, for example, by an expense report processor 140.

The extraction models 128, the receipt audit service 112, the policy audit service 114, the machine learning models 138, and the duplicate receipt detector 139 can be trained using historical data 132 generated from prior manual and automated audits of receipts, the historical data 132 associated with and received from multiple client customers of the expense management system. The historical data 132 can include data relating to past receipt/expense submissions, and compliance/non-compliance results.

An administrator can use a configuration application 142 running on the administrator client device 105 to configure one or more of the extraction models 128, the receipt audit service 112, the policy audit service 114, the machine learning models 138, and the duplicate receipt detector 139. For example, confidence value thresholds or other parameters can be configured for each entity. Some entities may desire or require stricter policy enforcement and may therefore have parameters or thresholds set to require a stronger match of information, for example. As another example, confidence thresholds that affect which receipts automatically pass an automated audit vs. which receipts are forwarded to a human auditor for a secondary (e.g., confirming) review can be tailored.

As used in the present disclosure, the term "computer" is intended to encompass any suitable processing device. For example, although FIG. 1 illustrates a single server 102, a single end-user client device 104, and a single customer client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150, 152, 153, and 154 are used by the server 102, the end-user client device 104, the administrator client device 105, and the auditor client device 106, respectively, for communicating with other systems in a distributed environment—including within the system 100—connected to the network 108. Generally, the interfaces 150, 152, 153, and 154 each comprise logic encoded in software and/or hardware in a suitable combination and operable to communicate with the network 108. More specifically, the interfaces 150, 152, 153, and 154 may each comprise software supporting one or more communication protocols associated with communications such that the network 108 or interface's hardware is operable to communicate physical signals within and outside of the illustrated system 100.

The server 102 includes one or more processors 156. Each processor 156 may be a central processing unit (CPU), a blade, an application specific integrated circuit (ASIC), a field-programmable gate array (FPGA), or another suitable component. Generally, each processor 156 executes instructions and manipulates data to perform the operations of the server 102. Specifically, each processor 156 executes the functionality required to receive and respond to requests from respective client devices, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes the memory 157. In some implementations, the server 102 includes multiple memories. The memory 157 may include any type of memory or database module and may take the form of volatile and/or non-volatile memory including, without limitation, magnetic media, optical media, random access memory (RAM), read-only memory (ROM), removable media, or any other suitable local or remote memory component. The memory 157 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The end-user client device 104, the auditor client device 106, and the administrator client device 105 may each generally be any computing device operable to connect to or communicate with the server 102 via the network 108 using a wireline or wireless connection. In general, the end-user client device 104, the auditor client device 106, and the administrator client device 105 each comprise an electronic computer device operable to receive, transmit, process, and store any appropriate data associated with the system 100 of FIG. 1. The end-user client device 104, the auditor client device 106, and the administrator client device 105 can each include one or more client applications, including the expense report application 116, the configuration application 142, or the auditing application 130, respectively. A client application is any type of application that allows a respective client device to request and view content on the respective client device. In some implementations, a client application can use parameters, metadata, and other information received at launch to access a particular set of data from the server 102. In some instances, a client application may be an agent or client-side version of an application running on the server 102 or another server.

The end-user client device 104, the auditor client device 106, and the administrator client device 105 respectively include processor(s) 160, 161, or 162. Each of the processor(s) 160, 161, or 162 may be a central processing unit (CPU), an application specific integrated circuit (ASIC), a field-programmable gate array (FPGA), or another suitable component. Generally, each processor 160, 161 or 162 executes instructions and manipulates data to perform the operations of the respective client device. Specifically, each processor 160, 161, or 162 executes the functionality required to send requests to the server 102 and to receive and process responses from the server 102.

The end-user client device 104, the auditor client device 106, and the administrator client device 105 are each generally intended to encompass any client computing device such as a laptop/notebook computer, wireless data port, smart phone, personal data assistant (PDA), tablet computing device, one or more processors within these devices, or any other suitable processing device. For example, a client device may comprise a computer that includes an input device, such as a keypad, touch screen, or other device that can accept user information, and an output device that conveys information associated with the operation of the server 102, or the respective client device itself, including digital data, visual information, or a GUI 165, a GUI 166, or a GUI 167, respectively.

The GUIs 165, 166, and 167 interface with at least a portion of the system 100 for any suitable purpose, including generating a visual representation of the expense report application 116, the configuration application 142, or the auditing application 130, respectively. In particular, the GUIs 165, 166, and 167 may be used to view and navigate various Web pages. Generally, the GUIs 112 165, 166, and 167 provide a respective user with an efficient and user-friendly presentation of business data provided by or communicated within the system. The GUIs 112 165, 166, and 167 may each comprise a plurality of customizable frames or views having interactive fields, pull-down lists, and buttons operated by the user. The GUIs 112 165, 166, and 167 each contemplate any suitable graphical user interface, such as a combination of a generic web browser, intelligent engine, and command line interface (CLI) that processes information and efficiently presents the results to the user visually.

Memories 168, 169, and 170 included in the end-user client device 104, the auditor client device 106, and the administrator client device 105, respectively, may each include any memory or database module and may take the form of volatile or non-volatile memory including, without limitation, magnetic media, optical media, random access memory (RAM), read-only memory (ROM), removable media, or any other suitable local or remote memory component. The memories 168, 169, and 170 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the associated client device. For example, the memory 169 includes audit questions 180, which may be a copy of a portion of the audit questions 134.

There may be any number of end-user client devices 104, auditor client devices 106, and administrator client devices 105 associated with, or external to, the system 100. For example, while the illustrated system 100 includes one end-user client device 104, alternative implementations of the system 100 may include multiple end-user client devices 104 communicably coupled to the server 102 and/or the network 108, or any other number suitable to the purposes of the system 100. Additionally, there may also be one or more additional end-user client devices 104 external to the illustrated portion of system 100 that are capable of interacting with the system 100 via the network 108. Further, the term "client," "client device," and "user" may be used interchangeably as appropriate without departing from the scope of this disclosure. Moreover, while client devices may be described in terms of being used by a single user, this disclosure contemplates that many users may use one computer, or that one user may use multiple computers.

Figure 2A:
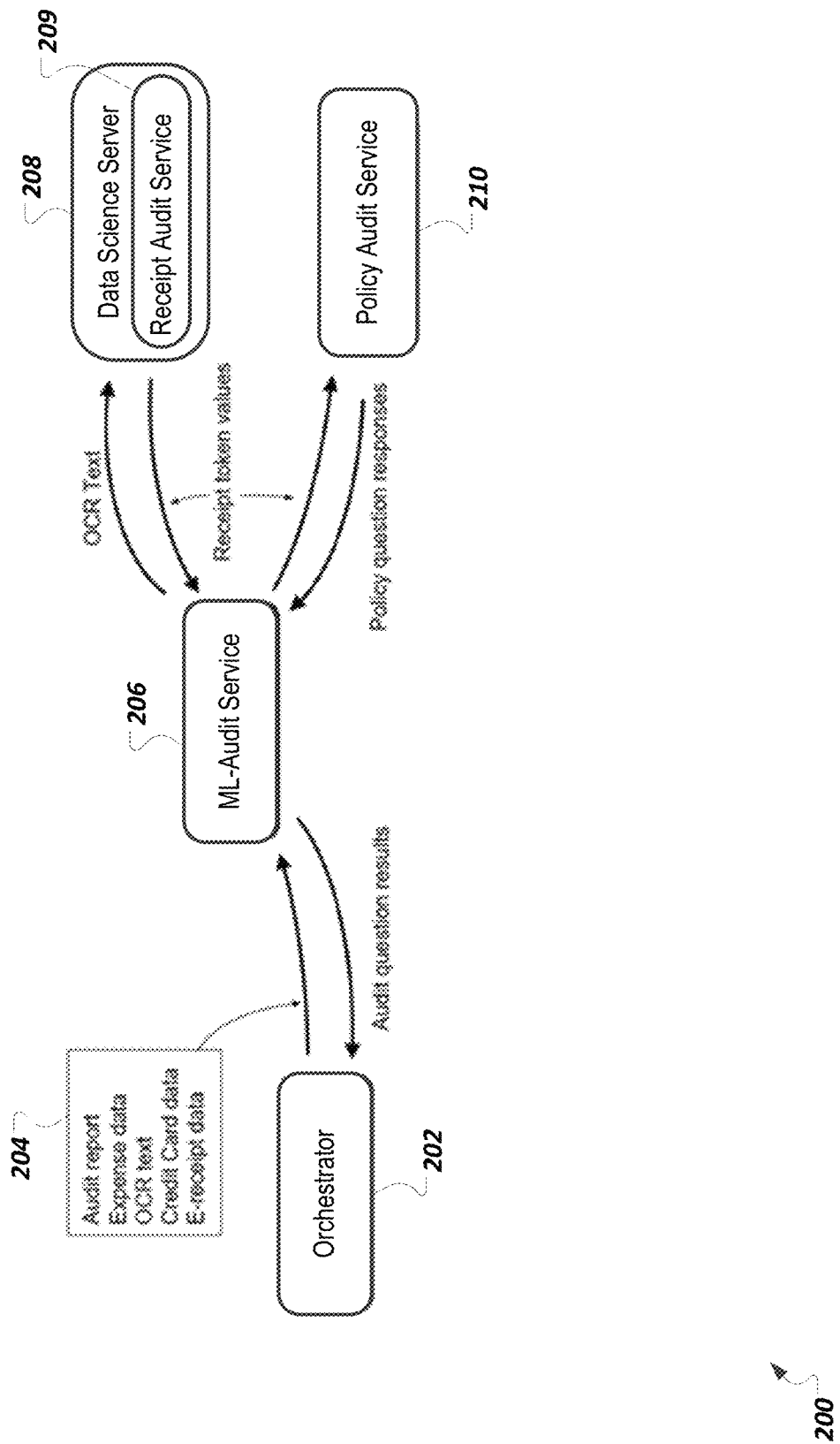
FIG. 2A illustrates an example system for expense report auditing.

FIG. 2A illustrates an example system 200 for expense report auditing. An orchestrator component 202 can orchestrate auditing of expense report items. For example, the orchestrator component 202 can request auditing for each expense included in an expense report. The orchestrator 202 can provide expense data and receipt information 204 (e.g., OCR text extracted from receipts, credit card receipt information, electronic receipt data) to a ML (Machine Learning) audit service 206. The ML audit service 206 can forward the expense data and receipt information 204 to a data science server 208.

The data science server 208 can extract receipt token values from the OCR text. In some implementations, the data science server 208 is configured to perform a receipt audit service 209. In other implementations, the receipt audit service 209 is performed by a different server. The receipt audit service 209 can compare the extracted receipt token values to the expense data to confirm that user-specified expense data is supported by the receipt token values. If a mismatch between user-specified and supported values is detected, an audit alert can be generated. An audit alert from a receipt audit can be treated as one type of audit question. An audit question for a receipt audit can be generally phrased as "is the receipt valid?", or "does the receipt support the expense claim?" An answer to a receipt audit question can be "yes", which means that the receipt data matches the expense data. An answer to a receipt audit question can be "no", with a qualifying reason, such as "an amount mismatch" or "a date mismatch".

The ML audit service 206 can receive a receipt audit result (e.g., answers to receipt audit question(s)). If a receipt audit question answer is "no", the receipt audit question answer can be provided to the orchestrator 202, and an action can be performed, such as to inform the user of a documentation mismatch, inform a user's manager, etc. Other receipt audit outcomes can include an inconclusive audit result due to an inability to extract necessary receipt token values (or a lack of confidence in extracted receipt token values).

If a receipt passes a receipt audit, receipt token values generated by the data science server 208 can be provided to the ML audit service 206 and then forwarded to a policy audit service 210. The policy audit service 210 can be configured to evaluate whether the receipt token values comply with various policies an entity may have configured for expense reimbursement. A policy audit can include answering a set of policy questions. A policy question can phrased, for example as "does the receipt include an alcohol expense?" Audit question results (e.g., answers) can be gathered and provided to the orchestrator 202. If any policy question answers correspond to a policy violation, the corresponding expense can be rejected and the user, the user's manager, etc., can be notified.

Figure 2B:
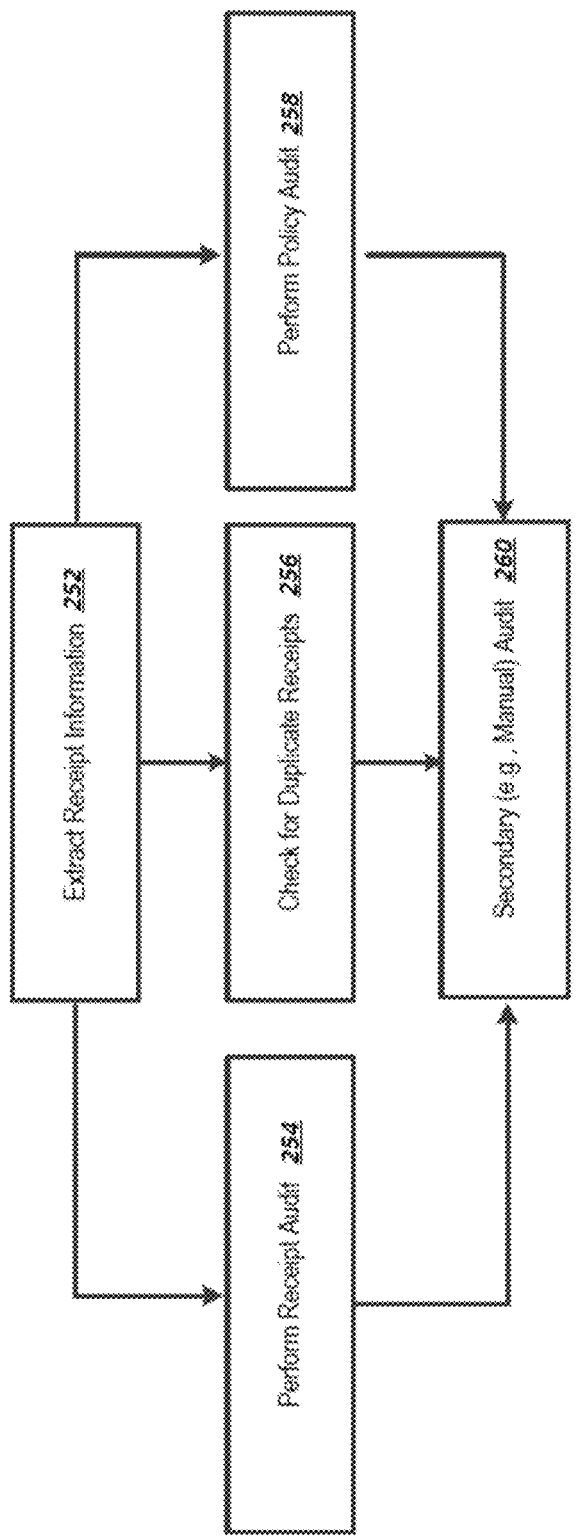
FIG. 2B is a flowchart of an example method for auditing a receipt associated with an expense report.

FIG. 2B is a flowchart of an example method 250 for auditing a receipt associated with an expense report. At 252, receipt information is extracted using one or more machine learning extraction models. For example, one or more different machine learning models can be used to extract the following tokens from a submitted receipt: an amount, a vendor name, a vendor location, an expense amount, an expense type, and a transaction time. Other tokens can be extracted. After tokens have been extracted, various type of audits can be performed. For example, at 254, a receipt audit can be performed. The receipt audit determines whether the receipt tokens match and support information a user submitted for an expense report claim. As another example, at 256, a duplicate receipt audit can be performed to determine whether a submitted receipt is a duplicate of another receipt that has already been submitted. As yet another example, at 258, a policy audit can be performed. A policy audit is a process of making sure that the claim initiated by the end user and the submitted receipt is compliant with various policies that the user's organization has configured. Additional operations can be performed in other implementations, as well as a subset of the indicated audits or evaluations.

The receipt audit, the duplicate receipt audit, and the policy audit can be performed in a variety of orders and/or may be performed, in various combinations, at least partially in parallel. For instance, in some implementations, the receipt audit is performed first, the duplicate receipt audit is performed second, and the policy audit is performed third. In other implementations, the duplicate receipt audit is performed first (as an example). In some implementations, all three audits are performed in parallel. Each audit can be performed by a different engine or service, by a same or by different servers, for example.

For some audit results of some audits, a secondary audit can be performed, at 260. A secondary audit can be a manual audit by a human auditor, for example. As another example, certain audit results from the receipt audit, the duplicate receipt audit, or the policy audit may result in initiation of other or alternative automated processing as part of a secondary audit.

Figure 3A:
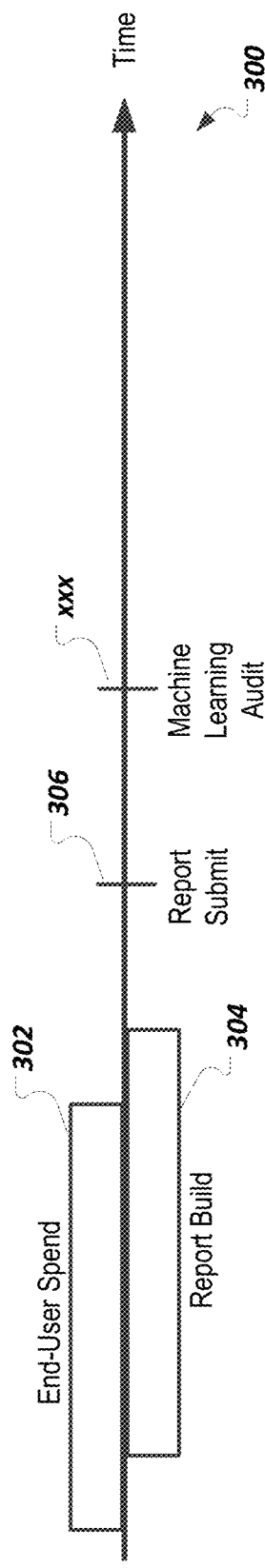
FIG. 3A illustrates a timeline for creation, submission, and auditing of an expense report.

FIG. 3A illustrates an example timeline 300 for creation, submission, and auditing of an expense report. In an end-user spend stage 302, a user has expenditures that may be later submitted on an expense report. In a report-build stage 304, the user creates the expense report that will later be submitted at a report-submit time point 306. As shown in FIG. 3A, the end-user spend stage 302 and the report-build stage 304 may overlap. That is, the user may, for example, at subsequent points in time: 1) spend on a first set of item(s), 2) begin to build an expense report that includes those first set of items, 3) spend on a second set of item(s); 4) add the second set of items to the expense report; and 5) submit the expense report. At an audit time point 308, the expense report can be audited by machine learning (and possibly human auditor(s)).

Figure 3B:
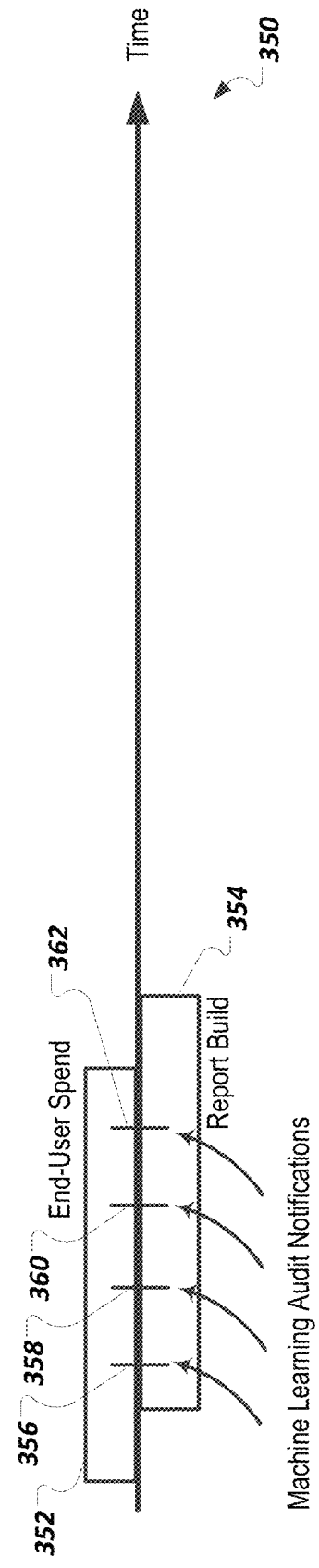
FIG. 3B illustrates another timeline for creation, submission, and auditing of an expense report.

FIG. 3B illustrates another example timeline 350 for creation, submission, and auditing of an expense report. The timeline 350 includes an end-user spend 352 stage that overlaps with a report-build stage 354, as above. Rather than perform an audit after report submission, some or all audit activities can be performed before report submission. For instance, audit activities and corresponding notifications of compliance or non-compliance can be performed at time points 356, 358, 360, and 362. For instance, when a user adds item(s) to an expense report that is being built, a machine learning system can perform an audit on the items that have been added (or that are currently included) in the to-be-submitted expense report. Another audit may or might not occur after the expense report has been submitted.

Figure 4A:
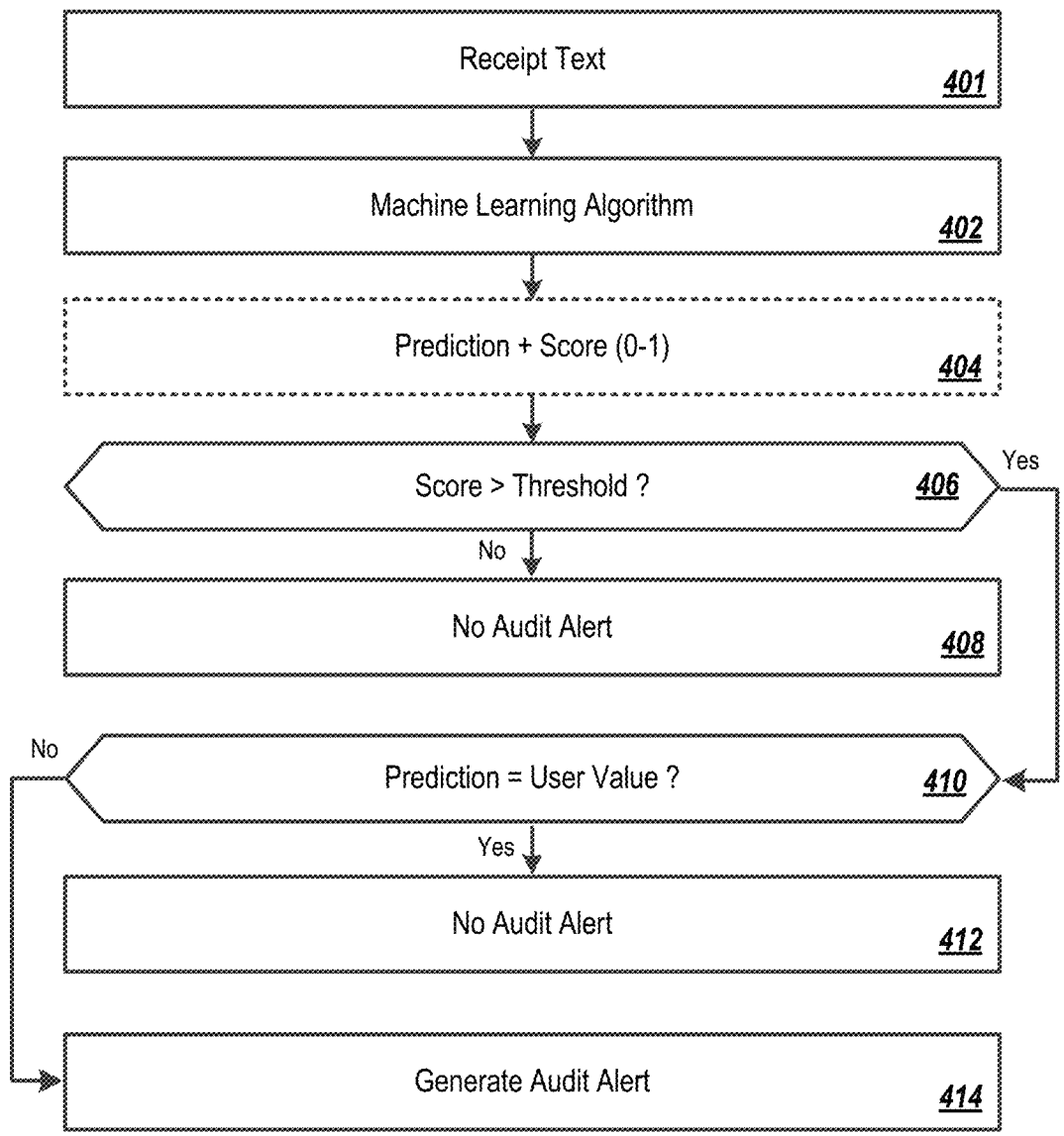
FIG. 4A is a flowchart of an example method for generating an audit alert as part of a receipt audit.

FIG. 4A is a flowchart of an example method 400 for generating an audit alert as part of a receipt audit. A machine learning engine receives receipt text 401 and performs a machine learning algorithm 402 to produce a prediction and a confidence score 404. The prediction includes predicted token values that a token extractor has extracted from the receipt. The confidence score may be, for example, a value between zero and one, where the value represents a relative confidence that the token extractor has correctly identified and extracted the correct tokens. In some implementations, each predicted value has a separate confidence score. Each token can be extracted using a machine learning model.

Some receipts can be similar to previously processed receipts for which tokens have been accurately and successfully extracted, for example. Accordingly, a confidence value generated when processing receipts that are similar to past successfully processed receipts can be higher than a confidence value for a receipt that is not similar to previously-processed receipts. As another example, textual items on the receipt can have an OCR-related confidence value that represents a confidence that an OCR process successfully recognized text from a receipt image. If a text item has a low OCR-related confidence score, an overall confidence score for a token identified based on the text item may be lower than for other tokens that have been identified from text items that have higher OCR-related confidence scores.

At 406, a determination is made as to whether the confidence score is greater than a threshold. The threshold can be predefined, or can be dynamic, and can be the same or different for different users/customers. If the confidence score is not greater than the threshold, no audit alert is generated (e.g., at 408). An audit alert can correspond to a determination that user-provided data does not match supporting information on a receipt. A low confidence score can represent that the system is not confident that correct information from the receipt has been identified. Accordingly, the system may not be confident in declaring that user-provided information does not match supporting information, and therefore an audit alert is not generated. However, another notification may be sent to the user, such as to inform the user that information on the receipt cannot be successfully identified (e.g., due to image blurriness or a receipt that presents information in a way that a machine learning model currently can't process (or has trouble processing)). In some implementations, in response to a low confidence score, the receipt is forwarded to a human auditor who may be able to successfully identify information on the receipt.

If the confidence score is greater than the threshold, a determination is made, at 410, as to whether the prediction matches user-specified value(s). A higher confidence score can represent that the system is confident that correct information has been extracted from the receipt. Accordingly, the system can be confident in performing a next step of comparing the prediction (e.g., the extracted tokens) to the user-specified value(s).

If the prediction matches the user-specified value, then no audit alert is generated (e.g., at 412). In other words, the system is confident that correct information has been extracted from the receipt and that the extracted information matches user-provided claim information.

If the prediction does not match the user-specified value, an audit alert is generated at 414. In these instances, the system is confident that correct information has been extracted from the receipt; however, the extracted information does not match user-provided information, which can mean that the user-provided information does not support the claim on the expense report. Accordingly, the audit alert is generated. As mentioned, the audit alert can be provided to the user, to a manager of the user, etc. In some implementations, generation of an audit alert results in the claim being submitted for manual review/confirmation.

Figure 4B:
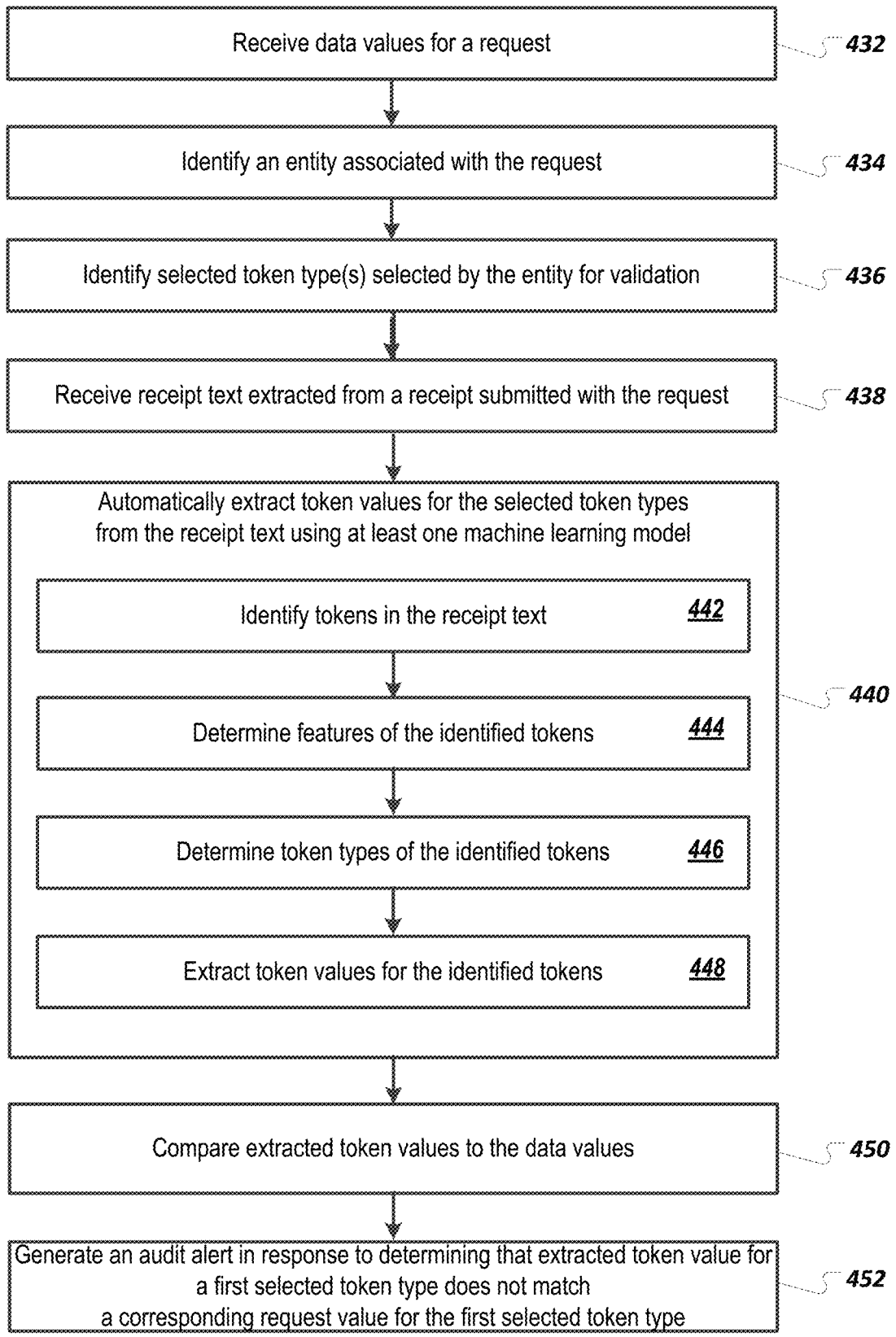
FIG. 4B is a flowchart of an example method for performing a receipt audit.

FIG. 4B is a flowchart of an example method 430 for performing a receipt audit. It will be understood that method 430 and related methods may be performed, for example, by any suitable system, environment, software, and hardware, or a combination of systems, environments, software, and hardware, as appropriate. For example, one or more of a client, a server, or other computing device can be used to execute method 430 and related methods and obtain any data from the memory of a client, the server, or the other computing device. In some implementations, the method 430 and related methods are executed by one or more components of the system 100 described above with respect to FIG. 1. For example, the method 430 and related methods can be executed by the receipt audit service 112 of FIG. 1.

At 432, data values for a request are received. For instance, expense claim information for an expense claim can be received. For example, a user may be working on or may have submitted an expense report.

At 434, an entity associated with the request is identified. For example, the user may be an employee of a particular entity.

At 436, one or more selected token types that have been selected by the entity for validation are identified. For example, different entities can desire that different checks are performed to ensure that certain tokens are present on a submitted receipt and that those certain tokens match corresponding items on an expense report. Token types can include, for example, date, amount, currency, vendor name, vendor location and expense type.

At 438, receipt text extracted from a receipt submitted with the request is received. For instance, extracted text can be received from an OCR service. The OCR service can extract the receipt text from an image of the receipt.

At 440, token values for the selected token types are automatically extracted from the receipt text using at least one machine learning model. The at least one machine learning model is trained using historical receipt text and historical data values.

At 442, as part of automatic extraction, tokens are identified in the receipt text.

At 444, as part of automatic extraction, features of the identified token are identified, for each respective identified token. Features can include, for example, keywords, text format, or receipt layout.

At 446, as part of automatic extraction, a token type of the identified token is determined from the selected token types, based on the features determined for the identified token, for each identified token. A confidence score is determined that indicates a likelihood that the identified token has the determined token type.

At 448, as part of automatic extraction, a token value for the identified token is extracted from the receipt text.

At 450, extracted token values are compared to the data values. Comparing includes identifying, in the data values and for each selected token type, a request value for the selected token type, and comparing, for each selected token type, the extracted token value for the selected token type to the request value for the selected token type. In some examples, to identified one or more tokens are compared to corresponding items in the expense claim information when the confidence score for one or more tokens is more than a predefined threshold. If a confidence score is less than the predefined threshold, a comparison may not occur, since the machine learning extraction models may not be confident that accurate token information has been extracted from the receipt, and may accordingly determine that a comparison to expense report information may not be valid or useful. In some implementations, when a confidence score is less than the predefined threshold, the receipt text and the expense claim information is forwarded for secondary processing (e.g., a manual review).

At 452, an audit alert is generated in response to determining that an extracted token value for a first selected token type does not match a corresponding request value for the first selected token type. The audit alert can be provided to a user who provided the expense claim information and/or to a manager of the user, for example. As another example, the audit alert can be sent to a system that can perform automatic processing based on the audit alert. For instance, an automatic request rejection can be sent in response to the request.

Figure 4C:
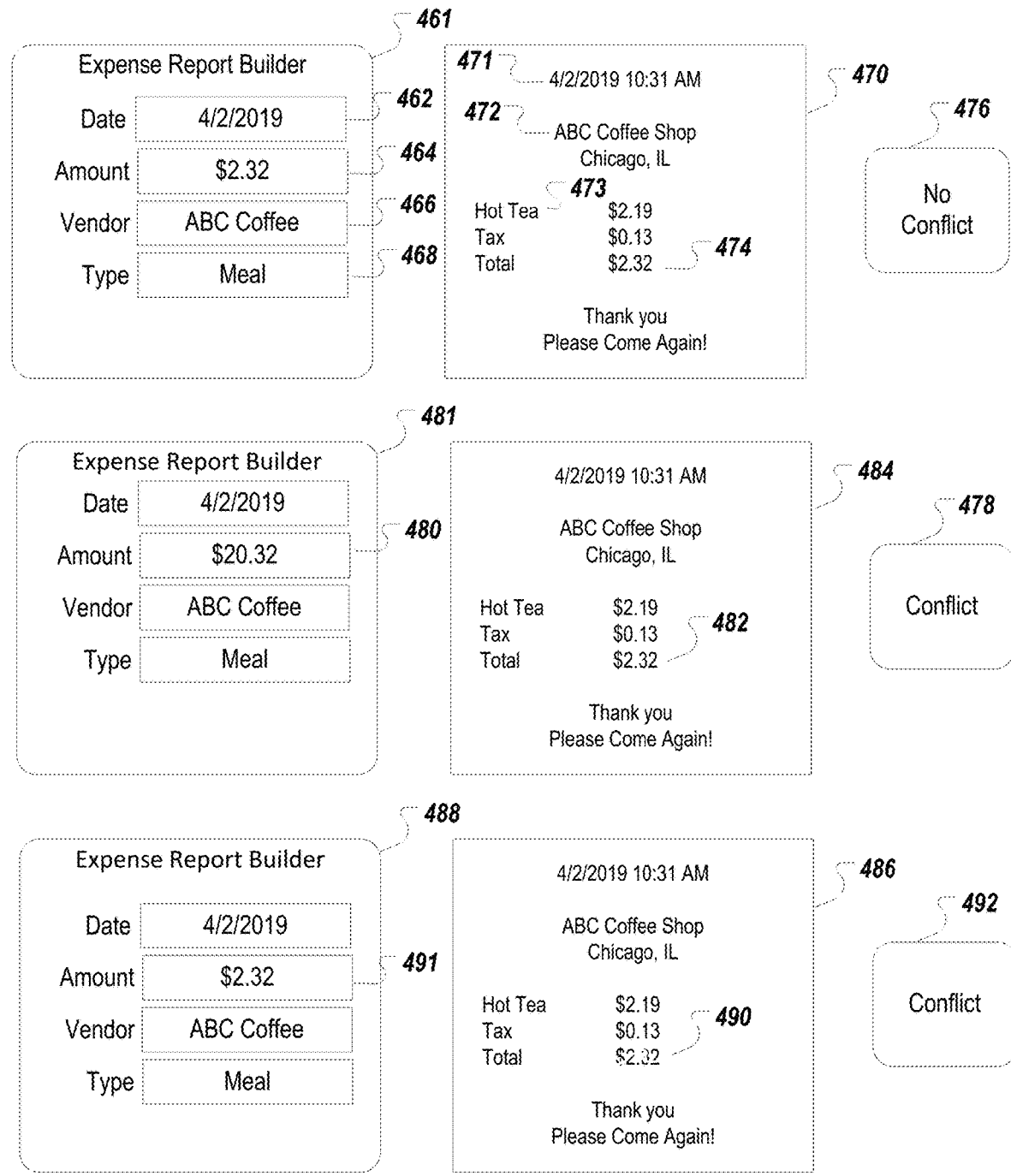
FIG. 4C is a conceptual diagram illustrating example user interfaces and example receipts.

FIG. 4C is a conceptual diagram 460 illustrating example user interfaces and example receipts. For instance, an expense report builder user interface 461 enables a user to enter information for an expense claim. For instance, the user can enter information in date 462, amount 464, vendor 466, and expense type 468 fields (or other fields). The user can provide a receipt 470 to support the claim. The receipt 470 includes a date 471, vendor information 472, an item description 473, and an amount 474. Date, vendor, item description, and amount tokens can be extracted based on identification of the date, vendor information 472, item description 473, and amount 474, respectively. Other tokens can be extracted. As part of a receipt audit, the extracted tokens can be compared to data that the user entered in fields of the report builder user interface 461.

For instance, the date 471 can be compared to the date value "Apr. 2, 2019" entered in the date field 462, the vendor information 472 can be compared to the vendor name "ABC Coffee" entered in the vendor field 466, the item description 473 can be compared to the "meal" expense type entered in the expense type field 468 (to determine that the item is of a category compatible to the category entered into the expense type field 468), and the amount 474 can be compared to the amount $2.32 entered in the amount field 464. In this example, values from the expense report builder user interface 461 match corresponding tokens extracted from the receipt 470, so a no-conflict audit result 476 can be generated.

As another example, a conflict audit result 478 can be generated if there is a mismatch between a claim and supporting information. For instance, a user may have incorrectly entered an amount value $20.32 in an amount field 480 of an expense report builder user interface 481. A receipt audit service can detect a mismatch between the $20.32 amount value in the amount field 480 and an amount 482 on a submitted receipt 484.

As yet another example, a user may submit a receipt 486 to support a claim entered using an expense report builder user interface 488. The receipt 486 includes a blurry amount value 490 that may result in a low confidence value during token extraction. For instance, a token extractor may fail to identify a value for the amount 490 or may identify a value (which may be a correct value of $2.32 or some other value due to blurriness) but with a low confidence value. A low confidence value and/or an incorrectly identified token (e.g., that does not match an amount in an amount field 491) may result in a conflict 492 being generated.

Figure 5:
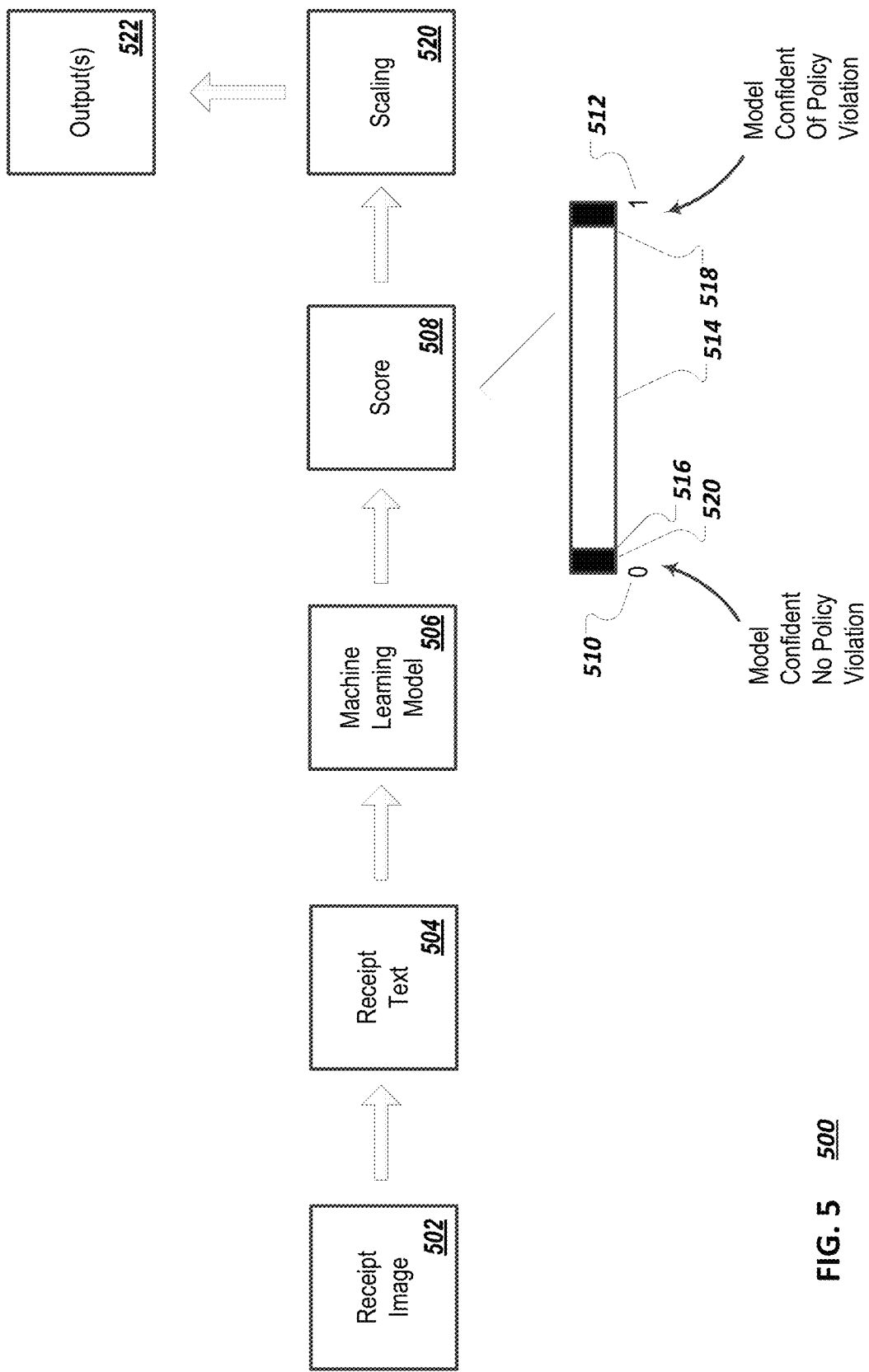
FIG. 5 illustrates an example of a system for expense report auditing.

FIG. 5 illustrates an example of a system 500 for expense report auditing. A receipt image component 502 can provide a receipt image to a receipt text component 504. The receipt text component 504 can generate receipt text, e.g., using OCR, from the received receipt image. The receipt text can be processed using a machine learning model 506. A machine learning engine can, for example, generate a score 508.

The score 508 can be, for example, a value between zero and one. A score of zero 510 can represent that the machine learning engine is confident (e.g., with a confidence value of 100%), that analyzed receipt text does not correspond to a policy violation. A score of one 512 can represent that the machine learning engine is confident (e.g., with a confidence value of 100%) that analyzed receipt text does correspond to a policy violation. A score can be produced for each policy question used by an entity.

A different machine learning model can be used for each policy question. For instance, a model can be used to handle a no-alcohol policy (e.g., a policy which states alcohol expenses are not reimbursable). The score of zero 510 can indicate that the machine learning engine is 100% confident that the receipt does not include an alcohol expense. The score of one 512 can indicate that the machine learning engine is 100% confident that the receipt does include an alcohol expense. A value somewhere in the middle, e.g., a score of 0.45 514, can indicate that the machine learning engine is not as certain as to whether the receipt has an alcohol expense.

If a computed score is within a threshold distance of either the zero score 510 or the one score 512, an audit result (e.g., no-policy violation, no policy violation) can be automatically determined. For instance, scores of 0.1 516 and 0.9 518, respectively, can represent threshold scores that can be compared to a computed score, to determine whether a receipt has an audit result automatically determined. For instance, a score between 0 and 0.1 can result in an automatic no-policy violation audit result and a score between 0.9 and 1 can result in an automatic policy-violation audit result.

In some implementations, the score 508 can be scaled by a scaling component 514 to generate a scaled score. A scaled score can be computed so that the scaled score can be compared to a single threshold value. For instance, the scaled score can be computed as:

scaled-score=2.0*absolute(score−0.5)

The scaled score can be compared to a single threshold. The single threshold can be computed as:

single-threshold=1.0−(2.0*confidence-threshold)

where confidence-threshold is a distance from an absolute confidence value (e.g., a distance from the zero score 510 or the one score 512).

For example, to have a confidence of 90%, a distance from an absolute confidence value can be 0.1 (e.g., corresponding to the scores 516 and 518, respectively). Accordingly, the single-threshold can be calculated, in this example, as:

single-threshold=1.0−(2.0*0.1)=0.8

A given scaled score can be compared to the single threshold, to determine, for example, whether the receipt can be automatically processed without manual intervention. For instance, for the score of 0.45 514, the scaled score can be computed as:

scaled-score=2.0*absolute(0.45−0.5)=0.1

The scaled-score value of 0.1 can be compared to the single threshold (e.g., 0.80), and since the scaled score value of 0.1 does not meet the single threshold, the receipt can be forwarded to a human auditor for further review. As another example, for a score of 0.05 520, the scaled score can be computed as:

scaled-score=2.0*absolute(0.05−0.5)=0.9

The scaled-score value of 0.9 can be compared to the single threshold (e.g., 0.80), and since the scaled score value of 0.9 exceeds the single threshold, an audit result for the receipt can be automatically determined (e.g., as not a policy violation). As yet another example, for the score 518 of 0.9, the scaled score can be computed as:

scaled-score=2.0*absolute(0.9−0.5)=0.8

The scaled score value of 0.8 can be compared to the single threshold (e.g., 0.80), and since the scaled score of 0.8 meets the single threshold, an audit result for the receipt can be automatically determined (e.g., as policy violation).

In summary, comparing the scaled score to the single threshold can result in one or more output(s) 522. As mentioned, if the scaled score does not meet the threshold, an output 522 can be a forwarding of the receipt image 502 (and, in some implementations, one or more outputs from the machine learning model 506), to a human auditor. As another example and as mentioned, if the scaled score meets the single threshold, an output 522 can be an automatically determined audit result (e.g., policy violation, no policy violation).

Figure 6:
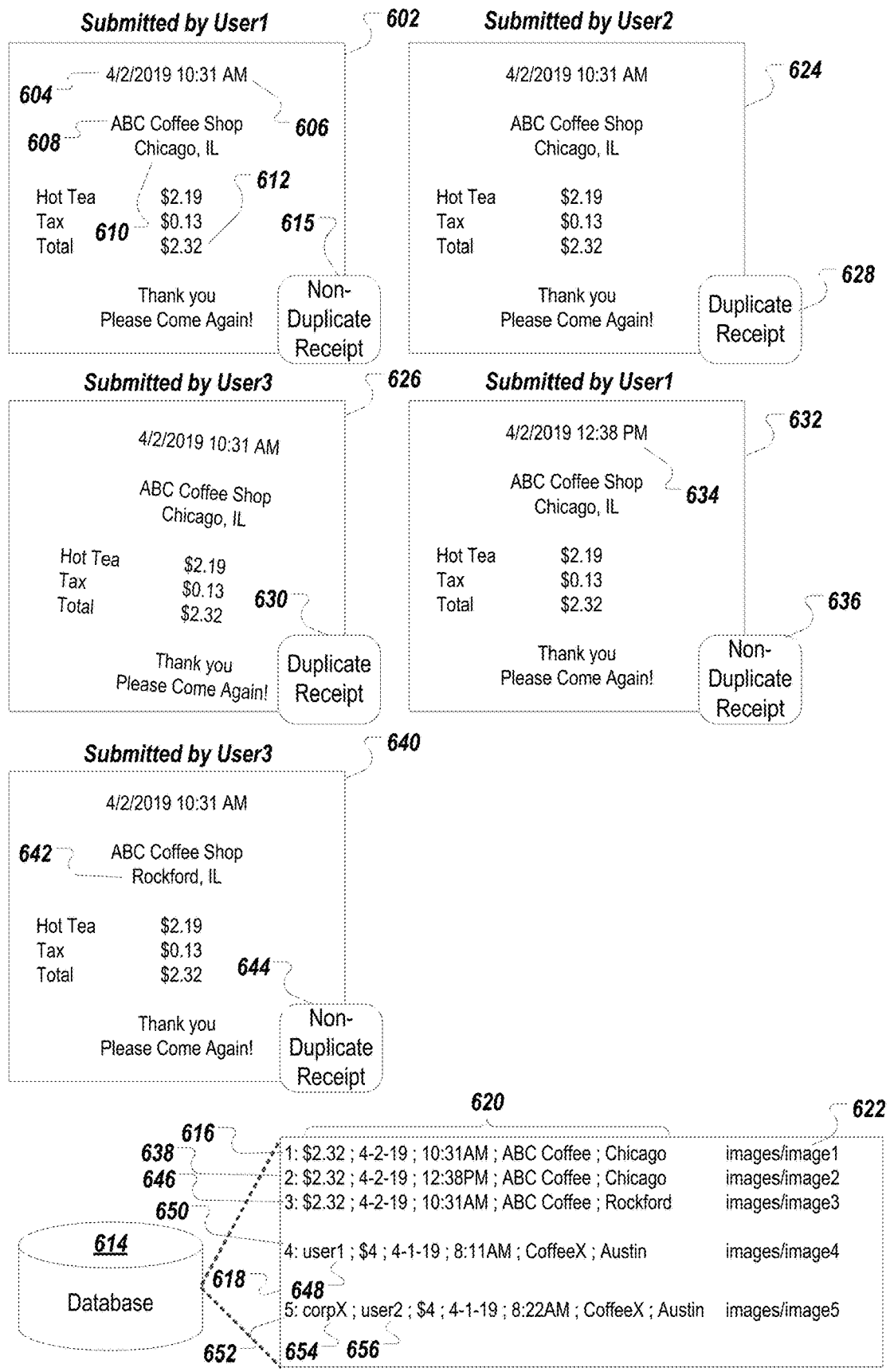
FIG. 6 illustrates a system for detecting duplicate receipts.

FIG. 6 illustrates a system 600 for detecting duplicate receipts. A first user (e.g., "user1") submits a receipt 602 with an expense report. An auditing system can extract information from the receipt 602 using any suitable OCR process, and, as part of an auditing process, determine whether the receipt 602 is a duplicate receipt. A duplicate receipt can be treated as a policy violation. Submitting duplicate receipts can be considered fraudulent activity, for example, or may be subject to further inspection and analysis. A duplicate receipt may be detected when a same user submits multiple copies of a same receipt. The multiple copies can be a same receipt image submitted multiple times or can be different copies (e.g., different image scans) of a same receipt.

A receipt can be a duplicate receipt even if submitted by different users. For instance, a second user may receive a receipt or a receipt image from a user who had already submitted the receipt. A second submission of same receipt information, by the second user, can be treated as a duplicate submission, and can be denied by the system. The different users may work for the same or for different companies. (e.g., the system 600 may be used by multiple clients, such that a same receipt may be received for reimbursement from two different companies). Whether from a same or a different company, a duplicate receipt can be detected by the system. A user of a different company may obtain an image of a receipt online, such as through email or through a website, for example. If the user of the different company attempts to submit a duplicate receipt, the system can detect a duplicate submission. As described in more detail below, duplicate submissions can be detected, for example, through use of a compound key that includes important receipt information along with a timestamp, but which might not include a user identifier or an entity/company identifier.

The receipt 602 includes a date 604, a time 606, a vendor name 608, a vendor location 610, and an amount 612. The auditing system can create a compound key using the date 604 and the time 606 (or a merged date/time value), the vendor name 608, the vendor location 610, and the amount 612, and determine whether a same compound key exists in a database 614 that stores information for previously received receipts.

The specific tokens of information used to form the compound key can be selected so that similar, valid transactions that occur at different times (for a same or different users) are not falsely detected as duplicates when coincidentally similar receipts are submitted, but multiple receipt copies of identical transactions are detected as duplicates. A time value (e.g., the date 604 and the time 606 or a merged date/time value), along with information identifying a transaction amount (e.g., the amount 612), and information identifying a specific vendor location (e.g., the vendor name 608 and the vendor location 610) can be used to uniquely identify a particular receipt. For duplicate receipts, a same time, a same amount, and a same vendor location can be extracted as tokens.

The auditing system can determine, at a time of a duplicate-receipt check, that the receipt 602 is not a duplicate receipt (e.g., as indicated by a note 615), by determining that the database 614 does not include an entry with a compound key equal to the compound key created from information on the receipt 602. The auditing system can, as part of receipt processing, create a new entry 616 (e.g., entry "1") in the database 614, as shown in example records 618. The new entry 616 includes a compound key 620, created from the date 604, the time 606, the vendor name 608, the vendor location 610, and the amount 612, as described above. The new entry 616 can include other information, such as a user identifier (e.g., an identifier associated with the "user1" user), a company/entity identifier, or a link 622 (or identifier or other reference) to an image of the receipt 602. The link 622 can be used for secure access to receipt images. For example, an authorized user, such as a manual reviewer or a manger of a user who submitted the receipt, can be provided access to a receipt image, using the link 622 or another image identifier or reference.

The first user or other user(s) may attempt to submit a receipt that has the same information as the receipt 602. For instance, a second user (e.g., "user2") may submit a receipt 624 and/or a third user (e.g., "user3") may submit a receipt 626. The receipt 624 may be, for example, a copy of an image (e.g., an identical image file) of the receipt 602 that was submitted by the first user. The receipt 626 may be a different image of the receipt 602. For instance, the first user may have submitted a first image of the receipt 602 and the second user may have submitted a different image (e.g., a different image scan) of the receipt 602, resulting in different image files with different image data. For instance, an image created from a second scan of the receipt 602 may have captured the receipt 602 at a different scan angle, as shown.

Whether a duplicate receipt is a same or different image file, the auditing system can detect a duplicate receipt submission. For instance, a tokenizer can extract receipt information, extracted tokens can be used to create compound keys, and a compound key comparison can be performed to determine whether a receipt is a duplicate. For instance, after extracting tokens and creating compound keys for the receipt 624 and the receipt 626, the auditing system can determine that respective compound keys for both the receipt 624 and the receipt 626 match the compound key 620 created for the receipt 602. Accordingly, both the receipt 624 and the receipt 626 can be flagged as duplicate receipts (e.g., as indicated by a note 628 and a note 630, respectively). Once flagged as a duplicate receipt, the auditing system can determine to not create an entry for the duplicate receipt in the database 614.

One or more duplicate-receipt actions can be performed in response to detection of a duplicate receipt. For instance, a notification can be sent to a respective user (e.g., the "user2" or the "user3" user), notifying that a submitted receipt is a duplicate. Additionally or alternatively, a notification can be sent to a manger of the user who submitted the receipt. Another example includes performing a secondary (e.g., manual) audit, for those receipts flagged as duplicate. In some implementations, data relating to detection of a duplicate receipt is used as feedback for adjusting or training one or more machine learning models.

As discussed above, auditing and notifications can be performed at various times. For instance, the second user may be in process of creating an expense report, and may add an expense item and upload an image of the receipt 624 while creating the expense report. The auditing system can detect, after the image of the receipt 624 has been uploaded, that the receipt 624 is a duplicate receipt. Accordingly, the second user can be notified of the duplicate (and thus invalid) receipt before the expense report is submitted. As another example, the auditing system can perform auditing checks, including duplicate receipt detection, when the expense report is submitted, in response to the expense report submission. As another example, auditing (and any generated notifications) can be performed in a post-processing phase that is at a later time point. For example, expense report submissions can be processed in a batch mode on a nightly basis.

The use of a compound key that includes a vendor name, a vendor location, a timestamp, and an amount enables duplicate receipt detection but allows for acceptance of receipts that are similar but not in fact duplicates. For instance, a receipt 632 submitted by the first user is for a same item purchased at the same vendor, but at a later time in the day. For instance, an amount, vendor name, vendor location, and date on the receipt 626 match corresponding items on the receipt 602, but a time 634 on the receipt 632 differs from the time 606 on the receipt 602. The first user may have ordered a second, same item while at the ABC Coffee Shop, may have returned later in the day to the ABC Coffee Shop and ordered a same item a second time on the same day, etc. A compound key created for the receipt 632 can differ from the compound key 620 created for the receipt 602, based on the difference between the time 634 and the time 606. Accordingly, since the compound key created for the receipt 632 differs from the compound key 620 (and from other compound keys in the database 614), the auditing system can determine that the receipt 632 is not a duplicate receipt (e.g., as indicated by a note 636). In response to determining that the receipt 632 is not a duplicate receipt, the auditing system can add an entry 638 to the database 614. The entry 638 can include a compound key created for the receipt 632, a link to an image of the receipt 632, and other relevant information and/or links to additional data or context.

As another example, a "user3" user has submitted a receipt 640. The receipt 640 has a same amount, vendor name, vendor location, date and time as the receipt 602. However, a vendor location 642 of Rockford, Ill. on the receipt 640 differs from the vendor location 610 of Chicago, Ill. on the receipt 602. Coincidentally, different users may have ordered a same (or same-priced) item, at a same vendor (e.g., a popular coffee shop with multiple locations), at a same time, but at different locations. Receipt submitted for these expenses should not be (and are not) treated by the auditing system as duplicate receipts, despite having similar information. A compound key created for the receipt 640 can differ from the compound key 620 created for the receipt 602, based on the difference between the vendor location 642 and the vendor location 610, for example. Accordingly, since the compound key created for the receipt 640 differs from the compound key 620 (and from other compound keys in the database 614), the auditing system can determine that the receipt 640 is not a duplicate receipt (e.g., as indicated by a note 644). In response to determining that the receipt 640 is not a duplicate receipt, the auditing system can add an entry 646 to the database 614. The entry 646 can include a compound key created for the receipt 640, a link to an image of the receipt 640, etc.

As shown for the entries 616, 638, and 646, a compound key can be formed without using user or entity/company identifiers, which can enable detection of duplicate receipts across users and/or across companies. In some implementations, a compound key, or a primary key that includes a compound key, can include a user identifier, such as a user identifier 648 in an entry 650. As another example and as shown in an entry 652, a record in the database 614 can include a company identifier 654 (e.g., as well as a user identifier 656). In some implementations, if receipts that have a same location, a same time, a same amount, but from different users, a user identifier or another process can be used to validate the receipts.

Figure 7:
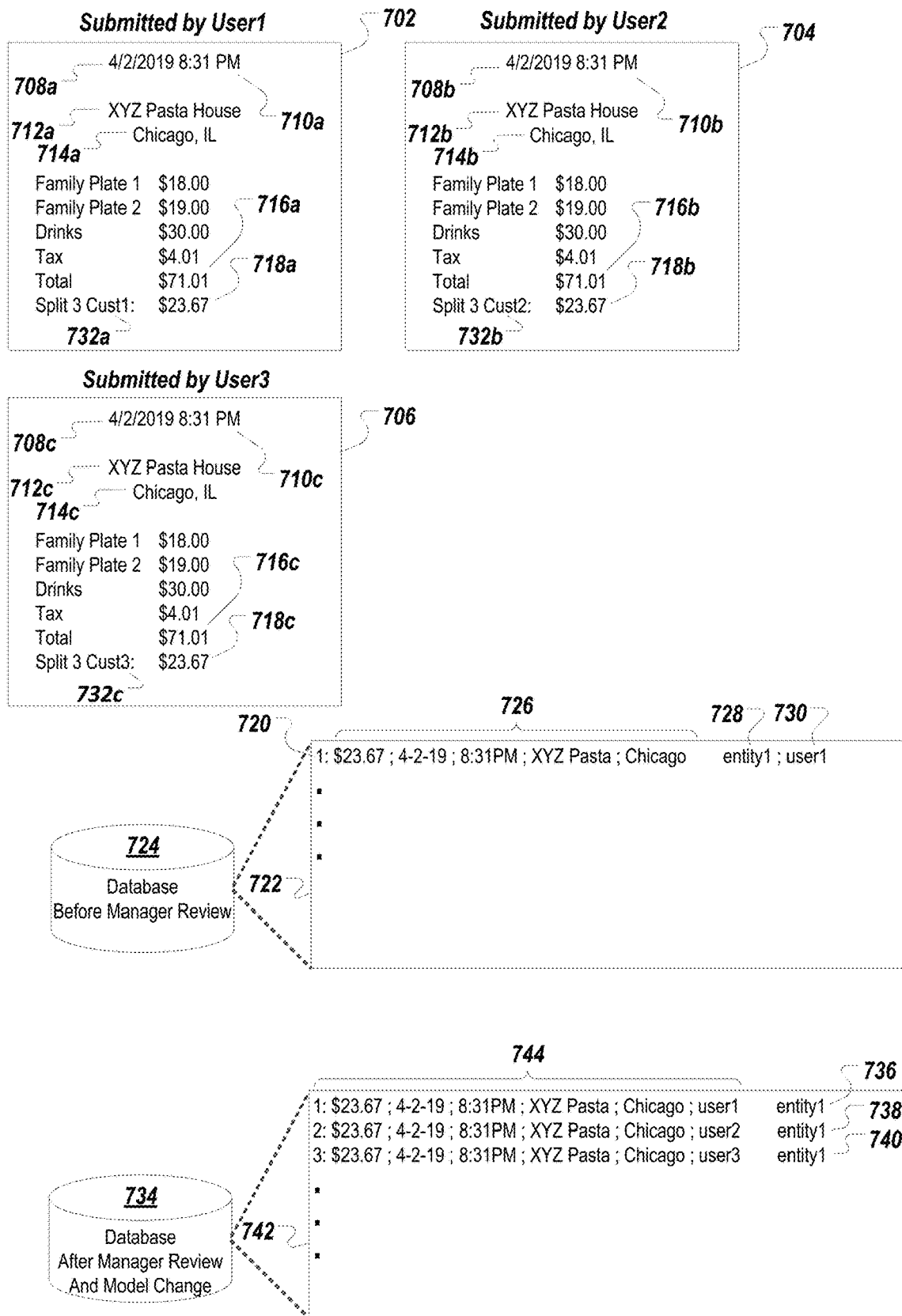
FIG. 7 illustrates a system for modifying duplicate receipt detection in a model.

FIG. 7 illustrates a system 700 for modifying duplicate receipt detection in a model. As an example, three employees of an entity may split a business dinner bill evenly. For instance, a user1 user receives a first receipt 702, a user2 user receives a second receipt 704, and a user3 user receives a third receipt 706. The first receipt 702 includes a date 708a, a time 710a, a vendor name 712a, a vendor location 714a, an overall total 716a, and a customer total 718a. The second receipt 704 and the third receipt 706 also include a same date, time, vendor name, vendor location, overall total, and customer total (e.g., as 708b-718b and 708c-718c, respectively). Each of the three employees may submit a respective receipt 702, 704, or 706. The first receipt submitted (e.g., the first receipt 702) may be accepted as a non-duplicate receipt. For instance, a record 720 is included in example records 722 of a database 724. The record 720 includes a compound key 726 that is an aggregation of the date 708a and the time 710a (or a date/time combination), the vendor name 712a, the vendor location 714a, and the customer total 718a. The compound key 726 may be stored in the database 724 as a hash value that is computed based on the aggregate information. In some implementations, the record 720 includes or is otherwise linked to an entity (e.g., company) identifier 728 and/or a user identifier 730.

The second receipt 704 and the third receipt 706 may be submitted after the first receipt 702 is submitted. An auditing system may initially flag the second receipt 704 and the third receipt 706 as duplicate receipts. For instance, when the second receipt 704 is submitted, a compound key for the second receipt 704 may be formed using the date 708b, the time 710b, the vendor name 712b, the vendor location 714b, and the customer total 718b. The compound key for the second receipt 704 can be compared to the compound key 726 created for the first receipt 702. The auditing system can reject the second receipt 704 as a duplicate receipt based on the compound key for the second receipt 704 matching the compound key 726. Similarly, in response to submission of the third receipt 706, the auditing system can reject the third receipt 706 as a duplicate receipt based on the compound key 726 matching a compound key formed using the date 708c, the time 710c, the vendor name 712c, the vendor location 714c, and the customer total 718c from the third receipt 706.

In some implementations, the rejected receipts 704 and 706 are submitted for a secondary review (which may be manual). A human auditor can, for example, determine that the receipts 704 and 706 are actually valid, due to a multi-split bill situation. The human auditor can initiate a process whereby the receipts 704 and 706 are approved. As another example, the user2 user and the user3 user can each receive a notification of a rejected expense report (or expense report item), and can request an appeal or a re-review of a respective report. A manager can review the rejections, determine that the expenses are valid, and approve the expenses.

The auditing system can learn, over time, to better handle false positives so as to not flag as duplicates similar receipts that are actually valid expenses. For instance, the auditing system can learn (or can be configured by an administrator) to identify other receipt information that may distinguish receipts that may be otherwise equal if just compared based on a certain set of fields historically used for a compound key. For instance, the auditing system can learn (or can be configured) to determine that customer number fields 732a, 732b, and 734b have different values (e.g., "cust1," "cust2," "cust3") across the receipts 702, 704, and 706, respectively. The auditing system can be configured to detect these differences on future expense submissions (e.g., for the particular company, that are associated with the particular vendor, etc.) and to treat multiple-copy split-bill receipts as different receipts if the different receipts have a distinguishing field (e.g., customer number, transaction number, a customer sub total amount in addition to an overall total amount, etc.).

For instance, a database 734 includes, after a model has been changed to handle recognizing different customer numbers on split bills, records 736, 738, and 740 in example records 742, corresponding to the receipts 702, 704, and 706 (or similar receipts), respectively. The record 736 includes a compound key 744 that now (as compared to the compound key 726) includes a user identifier value (e.g., user1). In some implementations, the compound key 744 and other compound keys used in the database 734 include a user identifier value, as shown, to distinguish the records 736, 738, and 740 from one another. For example, the compound key 744 may be a database table primary key and the user identifier field may be necessary to distinguish records for multiple copies of split-bill receipts. As another example, in some implementations, the compound key includes distinguishing values extracted from the receipts themselves (e.g., "cust1," "cust2," "cust3" values). As yet another example, in some implementations, information (e.g., user identifier, customer number, transaction number) that distinguishes split-bill receipts is not stored in a compound key, but is rather stored in other field(s) of respective records. The compound key may not be strictly used as a database table primary key, for example.

In some examples, hand-written notes written on receipts is used to distinguish receipts that may otherwise be flagged as duplicates. For instance, the employees may have written their names on their respective receipts. In some implementations, hand-written information, as well as printed information, is extracted as tokens when tokens are extracted from the receipt. In some implementations, detection of hand-written items on a receipt results in the receipt being sent for secondary (e.g., manual) review. For instance, a handwritten note may not automatically result in an otherwise duplicate receipt being accepted. A secondary review may be required, for example, to protect against fraud.

Figure 8:
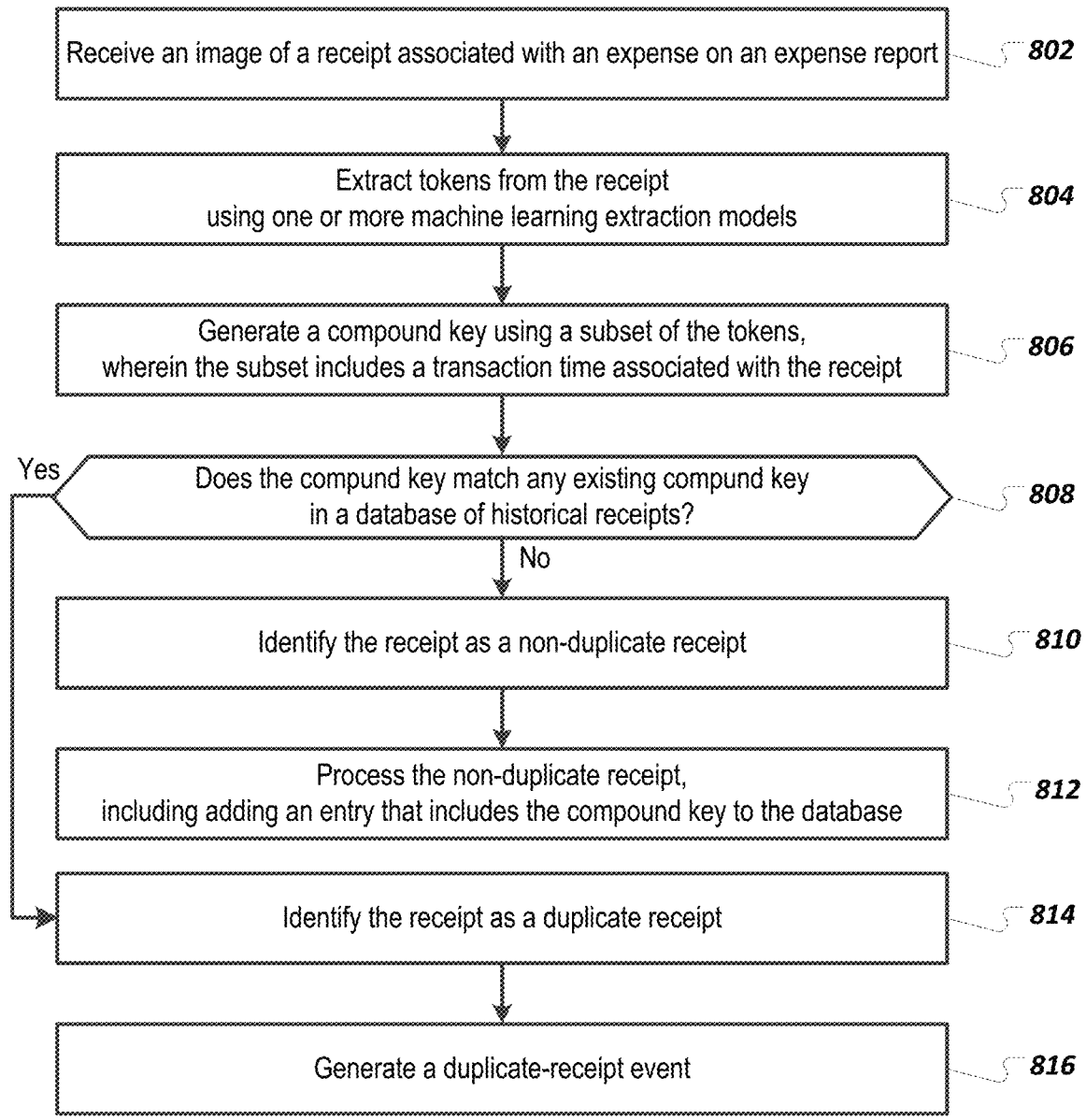
FIG. 8 is a flowchart of an example method for detecting a duplicate receipt.

FIG. 8 is a flowchart of an example method 800 for detecting a duplicate receipt. It will be understood that method 800 and related methods may be performed, for example, by any suitable system, environment, software, and hardware, or a combination of systems, environments, software, and hardware, as appropriate. For example, one or more of a client, a server, or other computing device can be used to execute method 800 and related methods and obtain any data from the memory of a client, the server, or the other computing device. In some implementations, the method 800 and related methods are executed by one or more components of the system 100 described above with respect to FIG. 1. For example, the method 800 and related methods can be executed by the duplicate receipt detector 139 of FIG. 1.

The method 800 can be performed for each receipt that is associated with an expense report, for example. Each entry in the expense report can be associated with a receipt. A given receipt may be associated with one or more expenses.

At 802, an image of a receipt associated with an expense on an expense report is received.

At 804, tokens are extracted from the receipt using one or more machine learning extraction models.

At 806, a compound key is generated using a subset of the tokens. The subset includes a transaction time associated with the receipt. The compound key can include, in addition to the transaction time, an amount, a vendor name, and a vendor location. The transaction time can be an aggregation of a date token and a time token extracted from the receipt.

In some implementations, generating the compound key can include generating a one-way, non-reversible hash value using the subset of tokens. A hash value can be used to alleviate privacy concerns, for example. When a hash value is used, the hash value, rather than actual items on the receipt, can be stored. Accordingly, a database that stores compound keys can be configured to not store data that may be directly attributable to a user.

At 808, a determination is made as to whether the compound key matches any existing compound key in a database of historical receipts.

At 810, in response to determining that the compound key does not match any existing compound keys, the receipt is identified as a non-duplicate receipt.

At 812, the non-duplicate receipt is processed, also in response to determining that the compound key does not match any existing compound keys. Processing includes adding an entry that includes the compound key to the database. Processing can include handling the expense as a valid expense and initiating a reimbursement to the user who submitted the image.

At 814, in response to determining that the compound key matches an existing compound key, the receipt is identified as a duplicate receipt.

At 816, a duplicate receipt event is generated, also in response to determining that the compound key matches an existing compound key. One or more actions can be performed in response to the duplicate receipt event.

The one or more actions can include providing a duplicate receipt notification to a user who provided the image. The duplicate receipt notification can be provided to the user before or after the expense report is submitted. The duplicate receipt notification can be provided to the user as the user is creating the expense report but before the expense report has been submitted, for example. The one or more actions can include sending a duplicate receipt notification to a manager of the user. The one or more actions can include rejecting the expense based on the duplicate receipt event.

The one or more actions can include performing a secondary analysis of the receipt in response to the duplicate receipt event. The secondary analysis can include performing an automated process to further analyze the extracted tokens. As another example, the secondary analysis can include performing a manual review of the image.

The secondary analysis can include determining that the duplicate receipt event comprises a false positive identification of a duplicate receipt. The secondary analysis can include determining a condition of the receipt that caused the false positive identification and configuring a machine learning engine to not identify a future receipt with the condition as a duplicate receipt. Configuring the machine learning engine can include configuring the machine learning engine to extract other, additional tokens that can be used to differentiate receipts that previously may have been identified as duplicates.

The existing compound key that matches the compound key can be associated with a receipt submitted by a user who provided the image. That is, if a same user submits multiple duplicate receipts, duplicate receipts after a first submission can be detected as duplicate receipts. The existing compound key that matches the compound key can be associated with a receipt submitted by a different user than a user who provided the image. That is, two different users can submit duplicate receipts, with a first user submitting a receipt first, and a second user submitting a duplicate receipt after the first user. The receipt submitted by the second user can be detected as a duplicate receipt. The second user's submission can be detected as a duplicate receipt even when the extracted tokens or compound keys generated from the submitted receipts do not include a user identifier.

The different user can be associated with a different entity than the user who provided the image. That is, two different users at two different companies can submit a same receipt, with a first user from a first company submitting the receipt first, and a second user from a second company submitting a duplicate receipt after the first user. The receipt submitted by the second user can be detected as a duplicate receipt. The second user's submission can be detected as a duplicate receipt even when the extracted tokens or compound keys generated from the submitted receipts do not include a company identifier or a user identifier.

Figure 9:
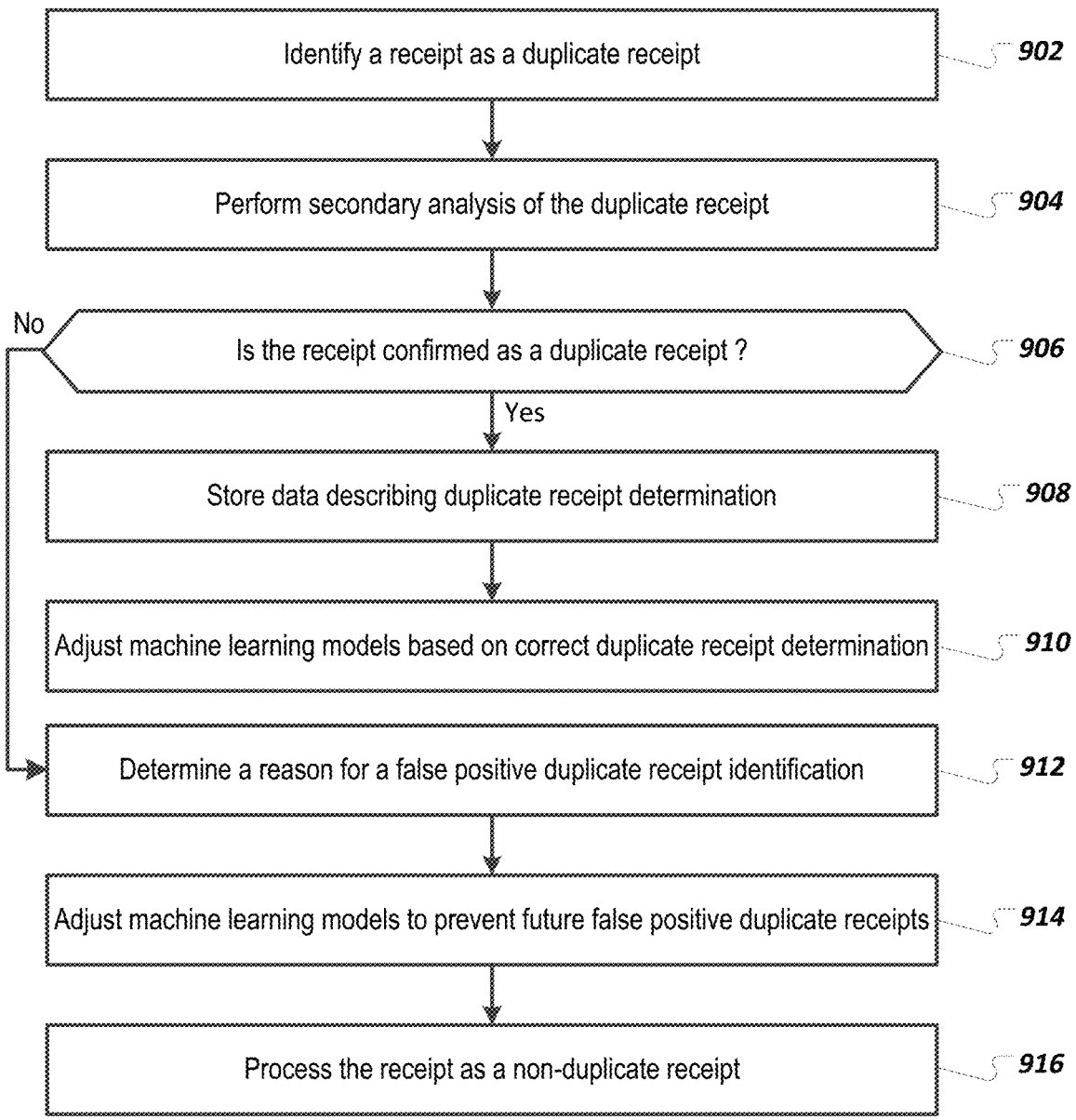
FIG. 9 is a flowchart of an example method for performing secondary analysis upon detection of a duplicate receipt.

FIG. 9 is a flowchart of an example method 900 for performing secondary analysis upon detection of a duplicate receipt. It will be understood that method 900 and related methods may be performed, for example, by any suitable system, environment, software, and hardware, or a combination of systems, environments, software, and hardware, as appropriate. For example, one or more of a client, a server, or other computing device can be used to execute method 900 and related methods and obtain any data from the memory of a client, the server, or the other computing device. In some implementations, the method 900 and related methods are executed by one or more components of the system 100 described above with respect to FIG. 1. For example, the method 900 and related methods can be executed by the duplicate receipt detector 139 of FIG. 1.

The method 900 can be performed each time a receipt is identified as a duplicate receipt. The method 900 can be performed for each receipt that is associated with an expense report, for example. Each entry in the expense report can be associated with a receipt. A given receipt may be associated with one or more expenses.

At 902, a receipt is identified as a duplicate receipt. For instance, a compound key for the receipt can match a compound key for a previously-submitted receipt.

At 904, a secondary analysis of the duplicate receipt is performed. The secondary analysis can be performed each time a duplicate receipt is identified, or can be performed when some other condition is met. For instance, a secondary analysis can be performed if more than a threshold number of duplicate receipts have been identified (e.g., in a particular time period, for a particular user, for a particular client/company, for a particular vendor, for a particular type of expense, for a particular amount of expense, or for some combination of these factors). The secondary analysis can be to confirm whether the receipt is a duplicate receipt. The secondary analysis can be a manual review, for example, or execution of an automated process.

At 906, a determination is made as to whether the receipt has been confirmed as a duplicate receipt.

At 908, in response to determining that the receipt has been confirmed as a duplicate receipt, data describing the duplicate receipt determination is stored. For instance, the following can be stored: tokens extracted from the duplicate receipt, a compound key generated for the duplicate receipt, and a compound key of an existing receipt that matched the compound key generated for the duplicate receipt.

At 910, one or more machine learning models are adjusted based on a confirmed duplicate receipt determination. For instance, one or more weights or parameters may be adjusted. As more and more receipts are confirmed as duplicates, for same reason(s), weights or parameters may be increased to reflect a higher confidence that detecting duplicate receipts for those reasons is an accurate determination. Adjusting weights or parameters can increase a likelihood of a future determination of a duplicate receipt for those same reasons.

At 912, in response to determining that the receipt has not been confirmed as a duplicate receipt, a reason for a false-positive duplicate receipt identification is determined. For example, one or more conditions or characteristics of a duplicate receipt, or an existing receipt that had been incorrectly matched to the receipt, can be identified.

At 914, one or more machine learning models are adjusted to prevent (or reduce) future false-positive duplicate receipts for a same reason as why the receipt was incorrectly identified as a duplicate receipt. For instance, a machine learning model can be adjusted to identify information in a receipt that would differentiate the receipt from existing receipts (e.g., where the information may not have been previously identified).

At 916, the receipt is processed as a non-duplicate receipt. For instance, the receipt can be approved for reimbursement processing for the user who submitted the receipt.

FIG. 10 is a list 1000 of example policies. Example policies can include for example, an itemized receipt policy 1002, a traveler name on receipt policy 1004, a valid tax receipt policy 1006, a no collusion policy 1008, a no personal services policy 1010, a no personal items policy 1012, a no personal entertainment policy 1014, a no traffic/parking violations policy 1016, a no penalty ticket fee policy 1018, a no companion travel policy 1020, a no travel insurance policy 1022, a no excessive tips policy 1024, a no premium air seating policy 1026, a no add-on air charges policy 1028, a no premium car class policy 1030, a no add-on car rental charges policy 1032, a no add-on hotel charges policy 1034, a no alcohol policy 1036, a no pet care, child care, elder care, or house sitting policy 1038, a no late, interest, or delinquency charges policy 1040, a no health club or gym charges policy 1042, and a no car washes policy 1044.

Other policies can be added/defined. Policies can be deleted or modified. A particular entity can select a subset of policies and add, change or deselect policies, at any point in time. Each policy can have a corresponding policy model. Each policy model can be trained using historical data (which may in part come from prior manual review), that includes historical receipt and an audit policy decision (policy violation, policy compliance) for each receipt.

Figure 11:
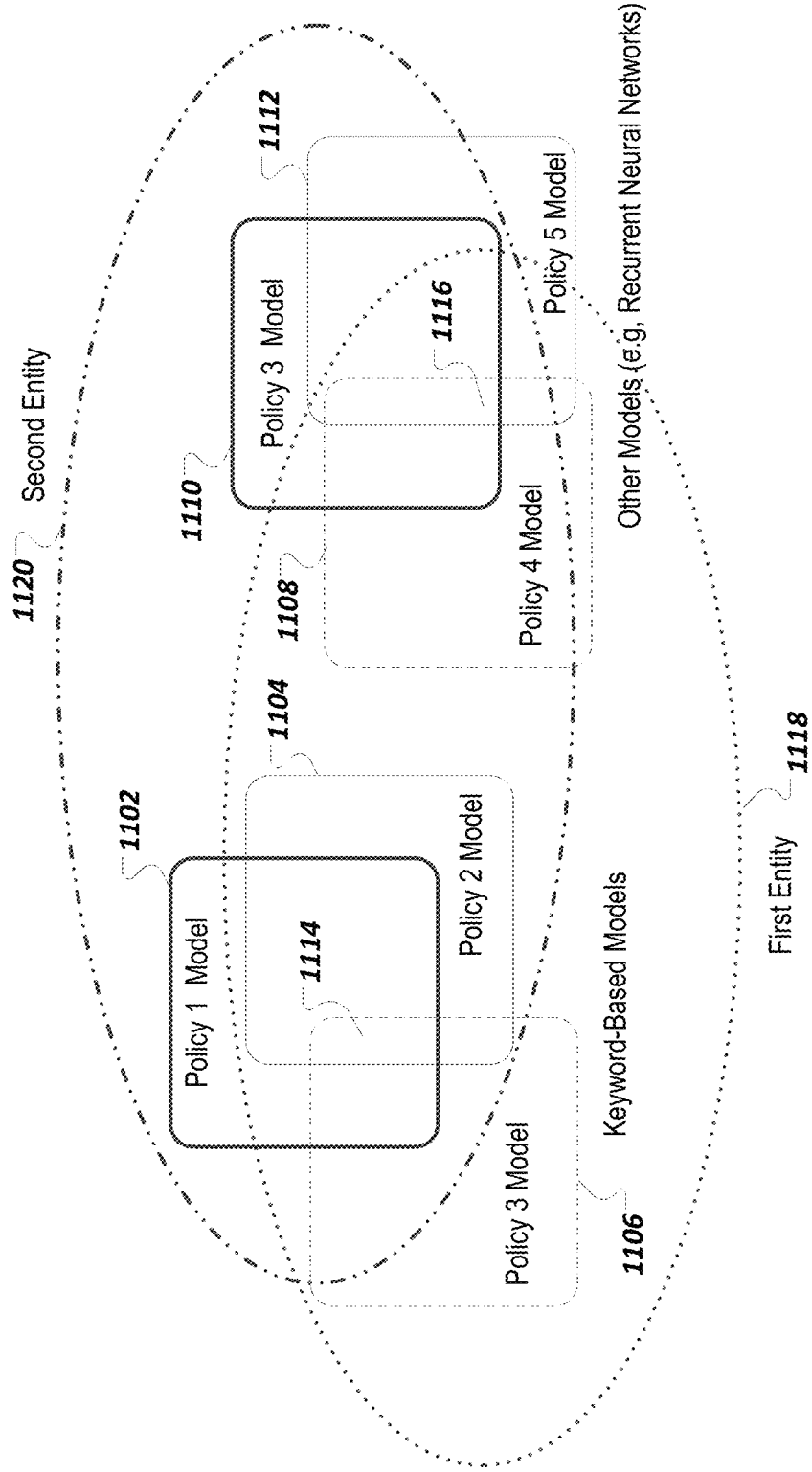
FIG. 11 is a conceptual diagram illustrating relationships between policies, policy models, and entities.

FIG. 11 is a conceptual diagram 1100 illustrating relationships between policies, policy models, and entities. Each policy can have a separate machine learning policy model. Policy models can be of different types. For instance, policies 1102, 1104, and 1106 are keyword-based models which are trained to find specific samples (e.g., keywords) of text in receipt text. As another example, policies 1108, 1110, and 1112 are recurrent neural network models that are trained to analyze whole receipt text character by character and make a determination about whether the receipt passes or fails a particular policy. Other types of models can be used. In some implementations and for some sets of models, similar models can share logic. For instance, the keyword-based models 1108, 1110, and 1112 can have common logic, as illustrated conceptually by a common area 1114. As another example, the recurrent neural network models 1108, 1110, and 1112 can have common logic, as illustrated conceptually by a common area 1116.

Each particular entity can choose or define a particular set of policies to use for expense processing. Corresponding models for those policies can be used when receipts are processed for the entity. For example, a first entity 1118 has chosen the policies 1104, 1106, and 1108. As another example, a second entity 1120 has chosen the policies 1102, 1104, and 1110.

Figure 12:
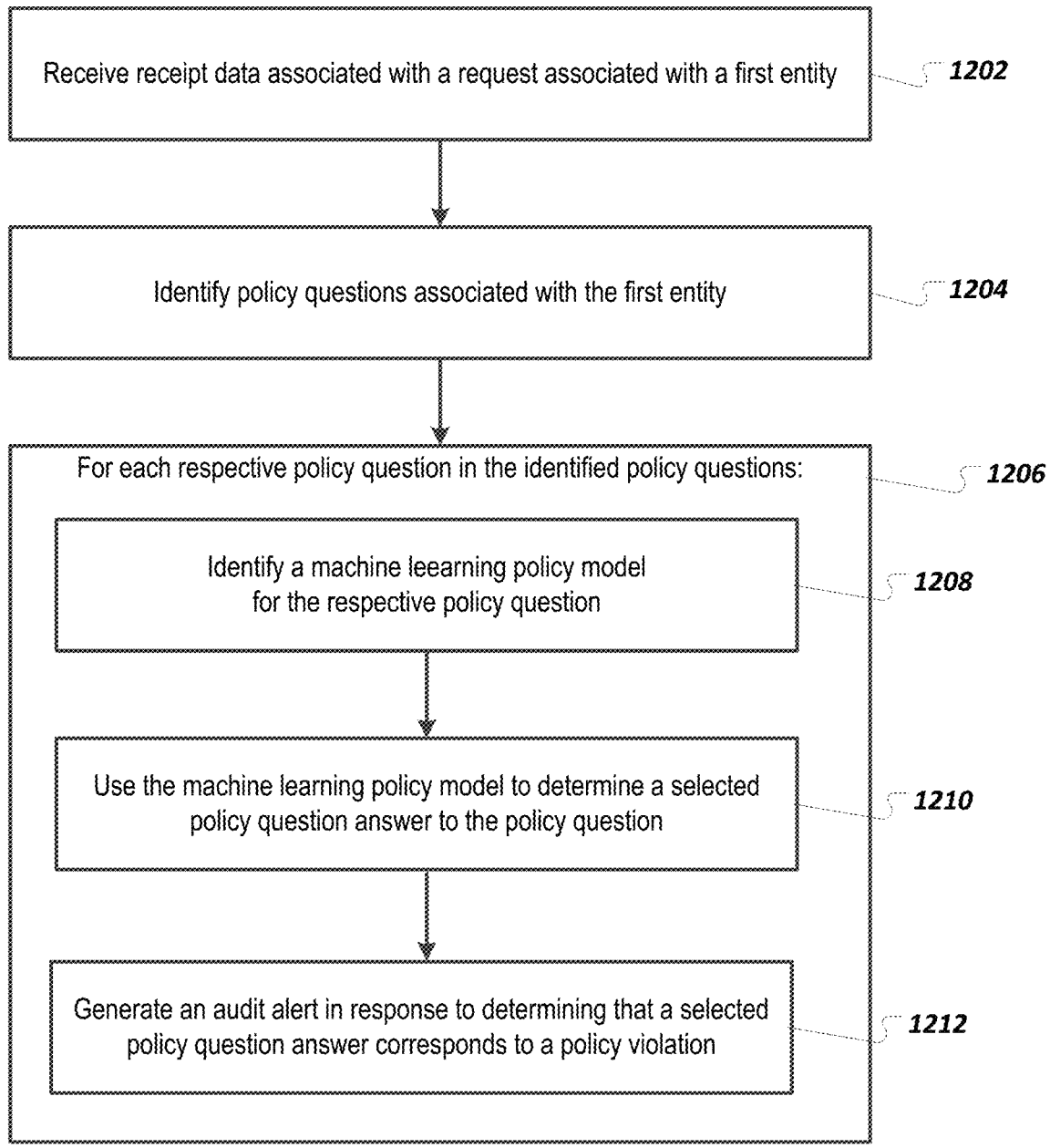
FIG. 12 is a flowchart of an example method for performing a policy audit.

FIG. 12 is a flowchart of an example method 1200 for performing a policy audit. It will be understood that method 1200 and related methods may be performed, for example, by any suitable system, environment, software, and hardware, or a combination of systems, environments, software, and hardware, as appropriate. For example, one or more of a client, a server, or other computing device can be used to execute method 1200 and related methods and obtain any data from the memory of a client, the server, or the other computing device. In some implementations, the method 1200 and related methods are executed by one or more components of the system 100 described above with respect to FIG. 1. For example, the method 1200 and related methods can be executed by the policy audit service 114 of FIG. 1.

At 1202, receipt data associated with a request associated with a first entity is received. The receipt data includes tokens extracted from at least one receipt. For example, a user may be working on or may have submitted an expense report. The receipt data may include tokens extracted from receipt text generated from an image of a receipt submitted with the expense report.

At 1204, policy questions associated with the first entity are identified. Each policy question is associated with at least one policy question answer, and each policy question answer corresponds to a conformance or a violation of a policy selected by the first entity. Each policy question can include a condition of receipt data that corresponds to a conformance or a violation of an expense policy selected by the first entity.

For example, a policy can be a no alcohol policy which prohibits alcohol expenses from being reimbursable. The condition of receipt data for the no alcohol policy can be that an alcohol item on the receipt that is included in a claimed amount is a violation of the no alcohol policy. The policy questions associated with the first entity include standard policy questions common to multiple entities and/or custom policy questions specific to the first entity.

At 1206, processing is performed for each respective policy question in the identified policy questions.

At 1208, a machine learning policy model is identified for the respective policy question based on a mapping associated with the first entity that maps policy questions to machine learning policy models. The machine learning policy model is trained based on historical determinations of policy question answers for the respective policy question for historical receipt data. The machine learning policy model includes, for each policy question answer, receipt data features that correspond to the policy question answer.

The historical determination of answers to the respective policy question can be answers that have been determined, based on the historical receipt data, by human auditors. The historical receipt data can include information from multiple entities. The multiple entities can include a second entity that is different from the first entity. For some policy questions, a policy model may not exist or may not otherwise be successfully identified. In such examples, the receipt data can be forwarded for processing by a second (e.g., manual) review process. In some examples, different policy questions that have a same semantic meaning are mapped to a same policy model (e.g., a same policy model can be identified for different, but semantically equivalent policy questions).

The identified policy model can be a keyword-based policy model. The keyword-based model can be configured to identify one or more keywords in the receipt data. The keyword-based model can be trained by a human administrator, and/or automatically based on automatic analyzing of historical receipts known to be in violation of or in compliance with the expense policy associated with the respective policy question.

The identified policy model can be a neural network (e.g., recurrent neural network) policy model. The neural network model can be configured to perform character analysis of the receipt data to identify features that indicate a policy violation or a policy conformance.

At 1210, the machine learning policy model is used to automatically determine a selected policy question answer to the respective policy question by comparing features of the extracted tokens to respective receipt data features of the policy question answers that are included in the machine learning policy model.

At 1212, an alert is generated in response to determining that the selected policy question answer corresponds to a policy violation.

Figure 13:
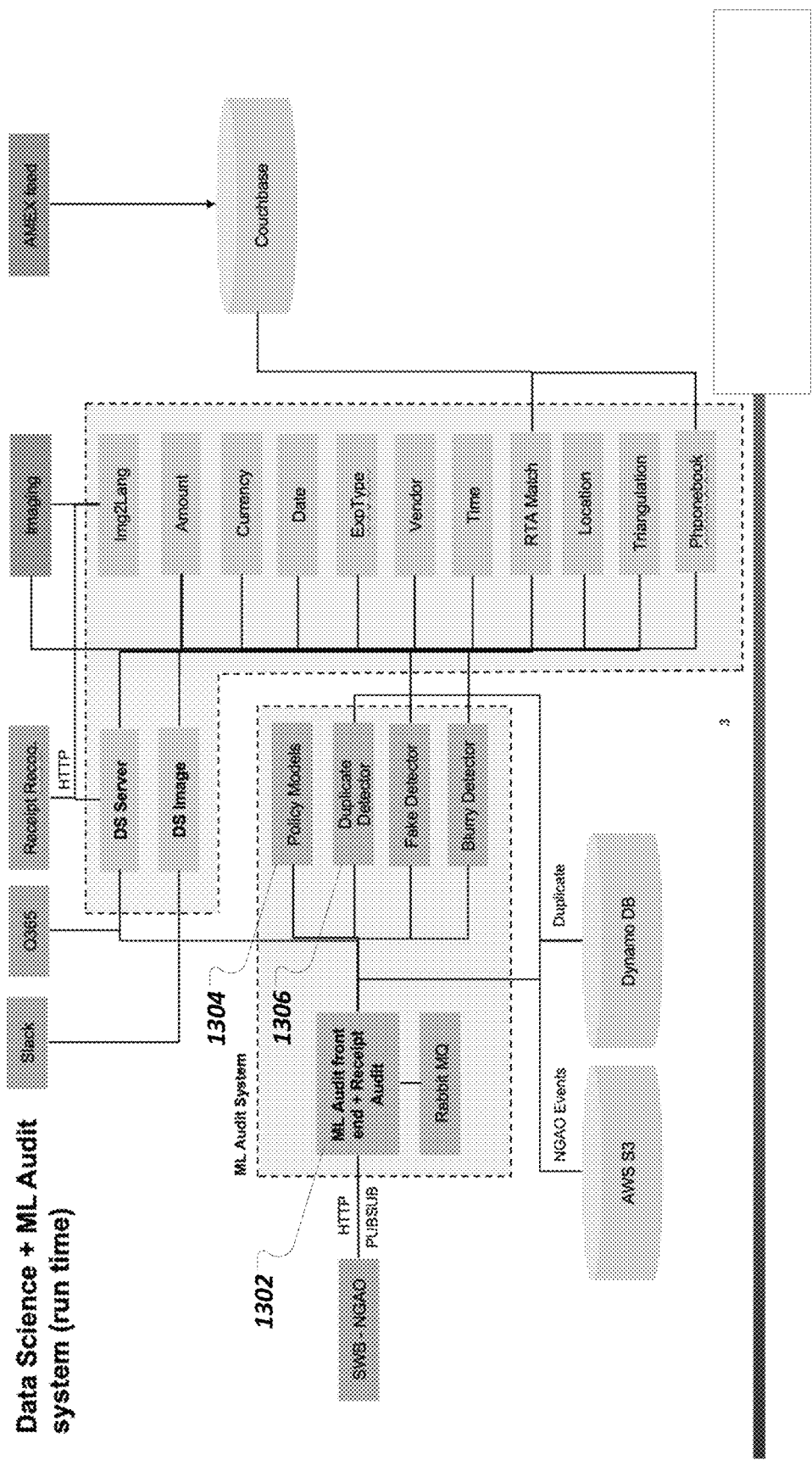
FIG. 13 illustrates an example system for receipt auditing.

FIG. 13 illustrates an example system 1300 for receipt auditing. The system 1300 includes various components. For example, a ML audit front end can include functionality for performing receipt audits. As another example, policy models 1304 can be used for policy audit(s). As yet another example, a duplicate receipt detector 1306 can detect duplicate receipts.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
   receiving receipt data associated with a request associated with a first policy-enforcer entity, wherein the receipt data includes tokens extracted from at least one receipt;
   identifying policy questions associated with the first policy-enforcer entity, wherein each policy question is associated with at least one policy question answer, and wherein each policy question answer corresponds to a conformance or a violation of a policy selected by the first policy-enforcer entity, wherein the identified policy questions associated with the first policy-enforcer entity include a first set of policy questions specific to the first policy-enforcer entity and a second set of policy questions common to multiple policy-enforcer entities, wherein the multiple policy-enforcer entities include the first policy-enforcer entity and at least a second policy enforcer entity that is a different entity than the first-policy enforcer entity; and
   for each respective policy question in the identified policy questions:
      identifying a machine learning policy model for the respective policy question based on a mapping associated with the first entity that maps policy questions to machine learning policy models, wherein the machine learning policy model is trained based on historical determinations of policy question answers for the respective policy question for historical receipt data, wherein the historical determinations of policy question answers includes different historical determinations for different policy-enforcer entities of the multiple policy-enforcer entities, and wherein the machine learning policy model includes, for each policy question answer, receipt data features that correspond to the policy question answer;
      using the machine learning policy model to automatically determine a selected policy question answer to the respective policy question by comparing features of the extracted tokens to respective receipt data features of the policy question answers that are included in the machine learning policy model; and
      in response to determining that the selected policy question answer corresponds to a policy violation, generating an audit alert.

2. The method of claim 1, wherein the historical determination of policy question answers to the respective policy question are determined, based on the historical receipt data, by previous executions of the machine learning policy model.

3. The method of claim 2, wherein the historical receipt data includes information from multiple policy-enforcer entities, wherein the multiple policy-enforcer entities include the second policy-enforcer entity and the first policy-enforcer entity.

4. The method of claim 1, further comprising:
   failing to identify, for a first policy question, a machine learning policy model for the first policy question; and
   forwarding the receipt data to a secondary review process in response to failing to identifying a machine learning policy model for the first policy question.

5. The method of claim 1, wherein different policy questions that have a same semantic meaning are mapped to a same machine learning policy model.

6. The method of claim 1, wherein identifying the machine learning policy model comprises identifying a keyword-based model.

7. The method of claim 6, wherein the keyword-based model is configured to identify one or more keywords in the extracted tokens.

8. The method of claim 1, wherein identifying the machine learning policy model comprises identifying a neural network model.

9. The method of claim 8, wherein the neural network model is a recurrent neural network model.

10. The method of claim 8, wherein the neural network model is configured to perform character analysis of the receipt data to identify features that indicate a policy violation or a policy conformance.

11. The method of claim 10, wherein the features include keyword patterns, receipt text format, and receipt layout.

12. A system comprising:
one or more computers; and
a computer-readable medium coupled to the one or more computers having instructions stored thereon which, when executed by the one or more computers, cause the one or more computers to perform operations comprising:
receiving receipt data associated with a request associated with a first policy-enforcer entity, wherein the receipt data includes tokens extracted from at least one receipt;
identifying policy questions associated with the first policy-enforcer entity, wherein each policy question is associated with at least one policy question answer, and wherein each policy question answer corresponds to a conformance or a violation of a policy selected by the first policy-enforcer entity, wherein the identified policy questions associated with the first policy-enforcer entity include a first set of policy questions specific to the first policy-enforcer entity and a second set of policy questions common to multiple policy-enforcer entities, wherein the multiple policy-enforcer entities include the first policy-enforcer entity and at least a second policy enforcer entity that is a different entity than the first-policy enforcer entity; and
for each respective policy question in the identified policy questions:
identifying a machine learning policy model for the respective policy question based on a mapping associated with the first entity that maps policy questions to machine learning policy models, wherein the machine learning policy model is trained based on historical determinations of policy question answers for the respective policy question for historical receipt data, wherein the historical determinations of policy question answers includes different historical determinations for different policy-enforcer entities of the multiple policy-enforcer entities, and wherein the machine learning policy model includes, for each policy question answer, receipt data features that correspond to the policy question answer;
using the machine learning policy model to automatically determine a selected policy question answer to the respective policy question by comparing features of the extracted tokens to respective receipt data features of the policy question answers that are included in the machine learning policy model; and
in response to determining that the selected policy question answer corresponds to a policy violation, generating an audit alert.

13. The system of claim 12, wherein the historical determination of policy question answers to the respective policy question are determined, based on the historical receipt data, by previous executions of the machine learning policy model.

14. The system of claim 13, wherein the historical receipt data includes information from multiple policy-enforcer entities, wherein the multiple policy-enforcer entities include the second policy-enforcer entity and the first policy-enforcer entity.

15. A computer program product encoded on a non-transitory storage medium, the product comprising non-transitory, computer readable instructions for causing one or more processors to perform operations comprising:
receiving receipt data associated with a request associated with a first policy-enforcer entity, wherein the receipt data includes tokens extracted from at least one receipt;
identifying policy questions associated with the first policy-enforcer entity, wherein each policy question is associated with at least one policy question answer, and wherein each policy question answer corresponds to a conformance or a violation of a policy selected by the first policy-enforcer entity, wherein the identified policy questions associated with the first policy-enforcer entity include a first set of policy questions specific to the first policy-enforcer entity and a second set of policy questions common to multiple policy-enforcer entities, wherein the multiple policy-enforcer entities include the first policy-enforcer entity and at least a second policy enforcer entity that is a different entity than the first-policy enforcer entity; and
for each respective policy question in the identified policy questions:
identifying a machine learning policy model for the respective policy question based on a mapping associated with the first entity that maps policy questions to machine learning policy models, wherein the machine learning policy model is trained based on historical determinations of policy question answers for the respective policy question for historical receipt data, wherein the historical determinations of policy question answers includes different historical determinations for different policy-enforcer entities of the multiple policy-enforcer entities, and wherein the machine learning policy model includes, for each policy question answer, receipt data features that correspond to the policy question answer;
using the machine learning policy model to automatically determine a selected policy question answer to the respective policy question by comparing features of the extracted tokens to respective receipt data features of the policy question answers that are included in the machine learning policy model; and
in response to determining that the selected policy question answer corresponds to a policy violation, generating an audit alert.

16. The computer program product of claim 15, wherein the historical determination of policy question answers to the respective policy question are determined, based on the historical receipt data, by previous executions of the machine learning policy model.

17. The computer program product of claim 16, wherein the historical receipt data includes information from multiple policy-enforcer entities, wherein the multiple policy-enforcer entities include the second policy-enforcer entity and the first policy-enforcer entity.

* * * * *